US010604069B2

(12) United States Patent
Manci et al.

(10) Patent No.: US 10,604,069 B2
(45) Date of Patent: *Mar. 31, 2020

(54) INDUSTRIAL VEHICLE GEO-FEATURE SYSTEM

(71) Applicant: Crown Equipment Corporation, New Bremen, OH (US)

(72) Inventors: Lewis H. Manci, New Bremen, OH (US); Philip W. Swift, Oakwood, OH (US); Lucas B. Waltz, Coldwater, OH (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/140,943

(22) Filed: Sep. 25, 2018

(65) Prior Publication Data

US 2019/0023180 A1 Jan. 24, 2019

Related U.S. Application Data

(63) Continuation of application No. 15/162,723, filed on May 24, 2016, now Pat. No. 10,086,756.

(Continued)

(51) Int. Cl.
*B60Q 1/00* (2006.01)
*B60Q 9/00* (2006.01)
(Continued)

(52) U.S. Cl.
CPC ............... *B60Q 9/00* (2013.01); *B66F 9/24* (2013.01); *B66F 17/003* (2013.01);
(Continued)

(58) Field of Classification Search
None
See application file for complete search history.

(56) References Cited

U.S. PATENT DOCUMENTS 5,258,911 A * 11/1993 Wellman ............. G05D 1/0229
180/167
8,924,044 B1 * 12/2014 Wang .................. G05D 1/0022
340/961

(Continued)

OTHER PUBLICATIONS

Birelscu, V.; Communication pursuant to Article 94(3) EPC; European Patent Application No. 16729676.3; dated Jan. 24, 2019; European Patent Office; Munich, Germany.

(Continued)

*Primary Examiner* — Julie B Lieu
(74) *Attorney, Agent, or Firm* — Stevens & Showalter LLP

(57) ABSTRACT

In location-based geo-feature implementations, messages for conveyance on an industrial vehicle are determined based on a current operating state of the industrial vehicle, information about a zone with expected operating conditions, and the industrial vehicle's location. When the industrial vehicle enters the zone, the current operating state of the industrial vehicle is compared to the expected operating state, which determines the message for display. Further, the current operating state may change the way the message is displayed. In vehicle-based implementations, vehicle data is collected and analyzed to generate messages upon the triggering of predetermined events. The detection of an event can be combined with vehicle position data to create an event record that captures location. Tools are also provided for setting up, managing and using the above capabilities.

20 Claims, 22 Drawing Sheets

Related U.S. Application Data

(60) Provisional application No. 62/166,082, filed on May 25, 2015.

(51) Int. Cl.
*G01C 21/20* (2006.01)
*B66F 9/24* (2006.01)
*G07C 5/00* (2006.01)
*B66F 17/00* (2006.01)
*G06Q 10/06* (2012.01)

(52) U.S. Cl.
CPC .......... *G01C 21/206* (2013.01); *G06Q 10/06* (2013.01); *G06Q 10/0631* (2013.01); *G07C 5/008* (2013.01); *G05D 2201/0216* (2013.01)

(56) References Cited

U.S. PATENT DOCUMENTS

| | | | | |
|---|---|---|---|---|
| 2004/0017404 | A1 | 1/2004 | Schileru-Key | |
| 2007/0013231 | A1* | 1/2007 | Yamashita | B60L 1/00 307/9.1 |
| 2008/0125965 | A1* | 5/2008 | Carani | G07C 5/008 701/408 |
| 2008/0154712 | A1* | 6/2008 | Wellman | G05D 1/0282 235/384 |
| 2008/0319602 | A1* | 12/2008 | McClellan | G07C 5/008 701/31.4 |
| 2010/0039247 | A1 | 2/2010 | Ziegler et al. | |
| 2011/0141753 | A1* | 6/2011 | Tanaka | F21S 41/689 362/464 |
| 2012/0077536 | A1* | 3/2012 | Goel | H04L 65/4061 455/518 |
| 2015/0064668 | A1 | 3/2015 | Manci et al. | |
| 2015/0230044 | A1* | 8/2015 | Paun | G06F 8/65 455/41.2 |

OTHER PUBLICATIONS

Birlescu, V; International Search Report and Written Opinion; International Application No. PCT/US2016/033864; dated Aug. 12, 2016; EPO; Rijswijk, Netherlands.

Baharlou. Simin; Inernational Preliminary Report on Patentability; International Application No. PCT/US2016/033864; dated Nov. 28, 2017; International Bureau of WIPO; Geneva, Switzerland.

Julie Bichngoc Lieu; Office Action; U.S. Appl. No. 15/162,723; dated Jul. 12, 2017; United States Patent and Trademark Office; Alexandria, Virginia.

Julie Bichngoc Lieu; Office Action; U.S. Appl. No. 15/162,723; dated Feb. 1, 2018; United States Patent and Trademark Office; Alexandria, Virginia.

Julie Bichngoc Lieu; Interview Summary; U.S. Appl. No. 15/162,723; dated May 2, 2018; United States Patent and Trademark Office; Alexandria, Virginia.

Julie Bichngoc Lieu; Notice of Allowance; U.S. Appl. No. 15/162,723; dated May 30, 2018; United States Patent and Trademark Office; Alexandria, Virginia.

\* cited by examiner

INDUSTRIAL VEHICLE GEO-FEATURE SYSTEM

CROSS REFERENCE TO RELATED APPLICATIONS

This application is a continuation of U.S. patent application Ser. No. 15/162,723, filed May 24, 2016, entitled INDUSTRIAL VEHICLE GEO-FEATURE SYSTEM, now allowed, which claims the benefit of U.S. Provisional Patent Application Ser. No. 62/166,082, filed May 25, 2015, entitled INDUSTRIAL VEHICLE GEO-FEATURE SYSTEM, the disclosures of which are hereby incorporated herein by reference.

BACKGROUND

The present disclosure relates to electronic systems for collecting information related to the operation of industrial vehicles, and in particular to the integration and manipulation of such information with geo-features.

Wireless strategies are being deployed by business operations, including distributors, retail stores, manufacturers, etc., to improve the efficiency and accuracy of business operations. Wireless strategies may also be deployed by such business operations to avoid the insidious effects of constantly increasing labor and logistics costs.

In a typical wireless implementation, workers are linked to a management system executing on a corresponding computer enterprise via mobile wireless transceivers. The wireless transceivers are used as interfaces to the management system to direct workers in their tasks, e.g., by instructing workers where and/or how to pick, pack, put away, move, stage, process or otherwise manipulate the items within a facility. The wireless transceiver may also be used in conjunction with a suitable input device to scan, sense or otherwise read tags, labels or other identifiers to track the movement of designated items within the facility.

BRIEF SUMMARY

According to aspects of the present disclosure, in an industrial vehicle, a machine-executable process is provided for determining a message to convey to the industrial vehicle. Here, the process is location-based, and is triggered based upon the industrial vehicle encountering a geo-feature.

According to further aspects of the present disclosure, a machine-executable process in an industrial vehicle environment, comprises obtaining geo-feature information about a geo-feature that is located in an area upon which an industrial vehicle travels. The process also comprises detecting that the industrial vehicle has encountered the geo-feature, and performing, upon detecting that the industrial vehicle has encountered the geo-feature, a set of operations. The set of operations comprises identifying a current operating state of the industrial vehicle by collecting operational information from the industrial vehicle, and determining an expected operating state of the industrial vehicle from the obtained geo-feature information. The set of operations also comprises comparing the current operating state of the industrial vehicle to the expected operating state of the industrial vehicle, and generating an output message. The output message comprises a select one of a first message where the comparison indicates that the current operating state is within an acceptable range of the expected operating state, and a second message different from the first message, where the current operating state is outside the acceptable range of the expected operating state. The process yet further comprises conveying the output message on the industrial vehicle.

According to further aspects of the present disclosure, conveying the output message may be altered based on the current operating state of the industrial vehicle at the time of encounter with the geo-feature. By way of example, the output message may be conveyed by way of text on a display screen, symbols or colors on a display screen, lights (illuminated in a pattern, color, etc.), audible sounds, voice/speech instructions played back through a speaker, haptic response, etc. Moreover, the output message typically represents an instruction, a positive reinforcement, a negative reinforcement, a warning, an alert, or other form of information that is intended for the industrial vehicle operator.

In addition to dynamically generating the output message, the process may also alter the output device or manner in which an output device delivers the generated output message. Thus, by way of example, the first message may comprise a text-based message dispatched to a display screen, whereas the second message may comprise a color dispatched to the display screen, a signal dispatched to a separate illumination device to flash a colored light, a signal dispatched to a speaker to issue a voice-command (spoken message), an audible tone played back through a speaker, etc. Additional examples are set out in the detailed disclosure herein. As such, the above-examples are not intended to be limiting.

According to still further aspects of the present disclosure, a graphical user interface for defining geo-features, comprises a hardware computing device configured to execute computer code to generate the graphical user interface, where the hardware device comprises a processor coupled to memory. The processor executes program code stored in the memory to implement a display area that depicts a graphical representation of a virtual environment that models a physical environment where industrial vehicles operate, and a tool that enables a user to define a geo-feature and position the defined geo-feature within the virtual environment. The processor executes program code stored in the memory to further implement a data entry feature that enables the user to define properties that characterize the defined geo-feature, and an upload feature that uploads the defined geo-feature and associated properties to a wireless infrastructure that enables wireless communication across the physical environment modeled by the virtual environment. In this regard, a processor maps the virtually positioned geo-feature to a corresponding geo-feature positioned in the physical environment, and programs the functionality of the geo-feature in the physical environment according to the properties associated with the geo-feature in the virtual environment. Moreover, upon an industrial vehicle encountering the defined geo-feature in the physical environment, a process triggers an action associated with the user-defined properties.

DETAILED DESCRIPTION

According to various aspects of the present disclosure, systems, and computer implemented processes are provided, which collect and blend industrial vehicle operational information with dynamic, virtual geo-feature information such that the virtual geo-feature information impacts, augments, or otherwise integrates with, real-world industrial vehicle activity within a working environment. Accordingly, the disclosure herein improves the technology of industrial vehicle operation, control and communication. Moreover, disclosure herein improves the technology of real-time position and operation monitoring, tracking and control.

In general terms, geo-features are used for processing location-based events. Also, geo-features are used for processing vehicle-based events. In this regard, tools are provided that enable a user (e.g., a manager, supervisor) to interact with a graphical user interface to define, create, manipulate, etc., geo-features, events, and other elements that affect a fleet of industrial vehicles. The graphical user interface can be executed on any processing device, such as on a tablet, smart phone or other hand-held processing device, laptop, desktop, etc. In an exemplary implementation of setting up location-based geo-features, the graphical user interface displays a model that represents a bounded or otherwise limited physical environment such as a warehouse. In a typical instance, the model shows a warehouse, including features such as rack locations, travel aisles, travel lanes, loading and unloading areas, etc. The user identifies geo-features, such as by drawing out geo-zones directly onto the model. The user may also (or alternatively) define geo-features by entering information in response to prompts issued through the graphical user interface. The user then generates geo-feature information, such as by assigning parameter(s) to the created geo-features to define a programmed action in response to an encounter with the created geo-feature.

For vehicle-based events, the user utilizes the graphical user interface to define events (event descriptions), where an event description characterizes an event related to an operation that is being carried out on the industrial vehicle. Here, the user defines the conditions of the event description (including dynamic variables) and a response to an occurrence to the event.

The information created on the graphical user interface is wirelessly loaded into industrial vehicles that operate in the physical environment represented by the model. As such, the industrial vehicles are specially programmed to respond to the created geo-features, programmed event descriptions, or combinations thereof. Thus for instance, during normal operation, when a programmed industrial vehicle encounters a geo-feature, an event is triggered that causes corresponding programmed action to occur on the industrial vehicle.

Figure 1:
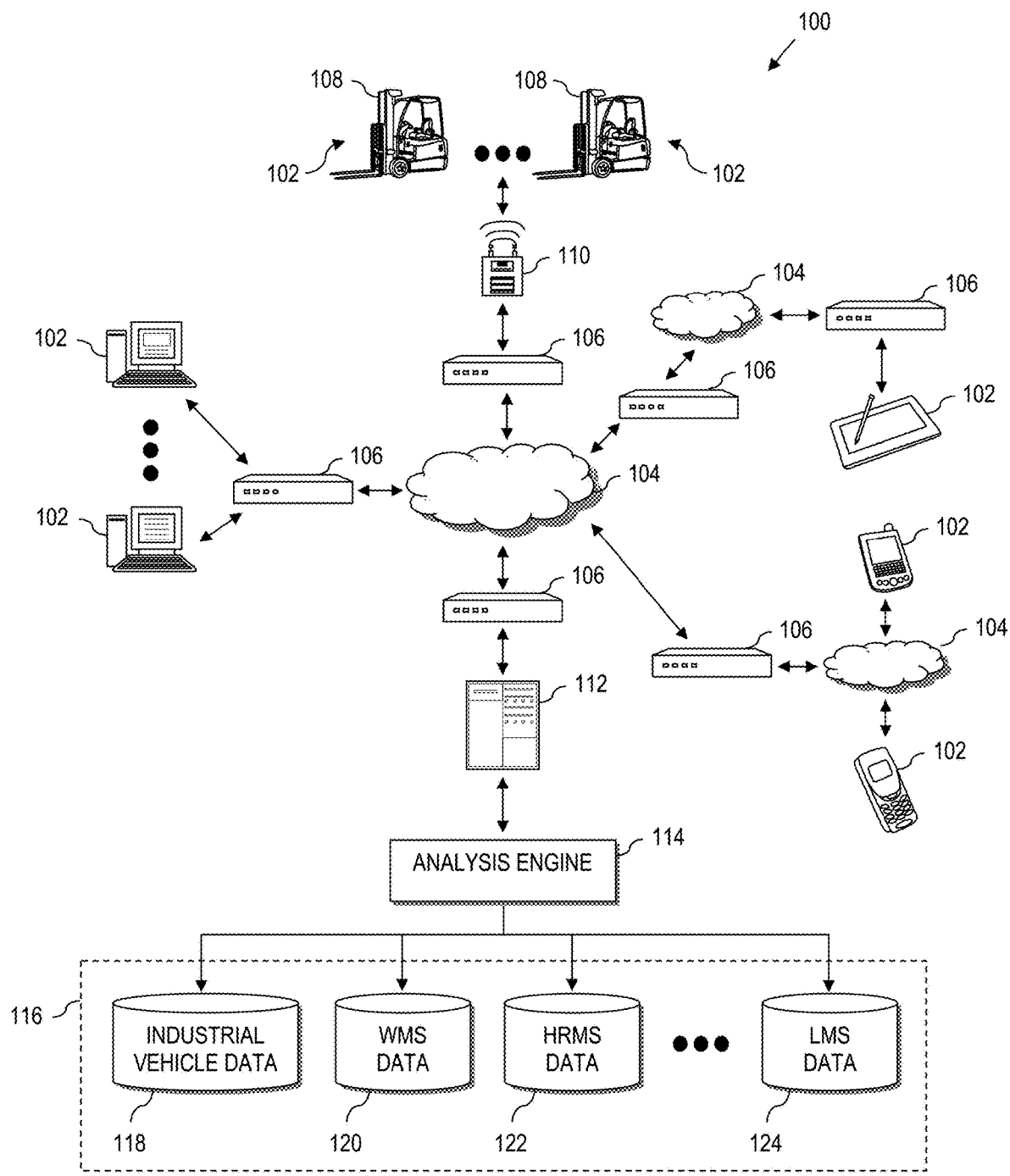
FIG. 1 is a block diagram of a system that includes geo-features, according to aspects of the disclosure.

System Overview:

Referring now to the drawings and in particular to FIG. 1, a general diagram of a computer system 100 is illustrated according to various aspects of the present disclosure. The illustrated computer system 100 is a special purpose (particular) system that operates using geo-features, event descriptions, or combinations thereof, as set out in greater detail herein. The computer system 100 comprises a plurality of hardware processing devices (designated generally by the reference 102) that are linked together by one or more network(s) (designated generally by the reference 104).

The network(s) 104 provides communications links between the various processing devices 102 and may be supported by networking components 106 that interconnect the processing devices 102, including for example, routers, hubs, firewalls, network interfaces, wired or wireless communications links and corresponding interconnections, cellular stations and corresponding cellular conversion technologies (e.g., to convert between cellular and TCP/IP, etc.). Moreover, the network(s) 104 may comprise connections using one or more intranets, extranets, local area networks (LAN), wide area networks (WAN), wireless networks (WiFi), the Internet, including the world wide web, cellular and/or other arrangements for enabling communication between the processing devices 102, in either real time or otherwise (e.g., via time shifting, batch processing, etc.).

A processing device 102 can be implemented as a transactional system, purpose-driven appliance, special purpose computing device and/or other device capable of communicating over the network 104. Other types of processing devices 102 include for example, personal data assistant (PDA) processors, palm computers, cellular devices including cellular mobile telephones and smart telephones and tablet computers. The processing devices 102 can also comprise netbook computers, notebook computers, personal computers and servers.

In certain contexts and roles, a processing device 102 is intended to be mobile (e.g., a processing device 102 provided on an industrial vehicle 108 such as a forklift truck, reach truck, stock picker, turret truck, tow tractor, rider pallet truck, walkie stacker truck, etc.). In this regard, industrial vehicles include a particular processing device 102 that communicates wirelessly to the network 104. Under such circumstances, the industrial vehicles 108 can wirelessly communicate through one or more access points 110 to a corresponding networking component 106. Alternatively, the industrial vehicles 108 can be equipped with WiFi, cellular or other suitable technology that allows the processing device 102 on the industrial vehicle 108 to communicate directly with a remote device (e.g., over the networks 104).

The illustrative computer system 100 also includes a server 112 (e.g., a web server, file server, and/or other processing device) that supports an analysis engine 114 and corresponding data sources (collectively identified as data sources 116). The analysis engine 114 and data sources 116 provide the resources to implement and store data related to geo-features and encounters with geo-features, captured events, combinations thereof, etc., as described in greater detail herein.

In an exemplary implementation, the data sources 116 are implemented by a collection of databases that store various types of information related to a business operation (e.g., a warehouse, distribution center, retail store, manufacturer, etc.). However, these data sources 116 need not be co-located. In the illustrative example, the data sources 116 include databases that tie processes executing for the benefit of the enterprise, from multiple, different domains. In the illustrated example, data sources 116 include an industrial vehicle information database 118 (supporting processes executing in an industrial vehicle operation domain), a warehouse management system (WMS) 120 (supporting processes executing in WMS domain that relate to movement and tracking of goods within the operating environment), a human resources management system (HRMS) 122 (supporting processes executing in an HRMS domain), a labor management system (LMS) 124 (supporting processes executing in an LMS domain), etc.

The above list is not exhaustive and is intended to be illustrative only. Other data, such as from an enterprise resources planning (ERP) database, content management (CM) database, location tracking database, voice recognition data source (for electronically receiving voice commands from an operator), voice command/messaging system (for electronically conveying voice commands to the operator), and their corresponding domain processes etc., may also and/or alternatively be present. Moreover, data can come from sources that are not directly and/or locally connected to the analysis engine 114. For instance, in certain exemplary implementations, data may be obtained from remote servers (e.g., to access manufacturer databases, etc.).

Industrial Vehicle:

As noted above, in certain contexts and roles, a processing device 102 is provided on an industrial vehicle 108. Here, the processing device 102 is a special purpose, particular computer, such as a device that mounts to or is otherwise integrated with the industrial vehicle 108. The processing device 102 includes a processor coupled to memory to carry out instructions. However, the execution environment of the processing device 102 is further tied into the industrial vehicle 108 making it a particular machine different from a general purpose computer.

For instance, an example computing device 102 on an industrial vehicle is a mobile asset information linking device (see information linking device 38) as set out in U.S. Pat. No. 8,060,400, the disclosure of which is incorporated by reference in its entirety. In certain illustrative implementations, the processing device 102 also communicates with components of the corresponding industrial vehicle 108 (e.g., via a vehicle network bus (e.g., CAN bus), short range wireless technology (e.g., via Bluetooth or other suitable approach), or other wired connection, examples of which are set out further in U.S. Pat. No. 8,060,400, already incorporated by reference.

Figure 2:
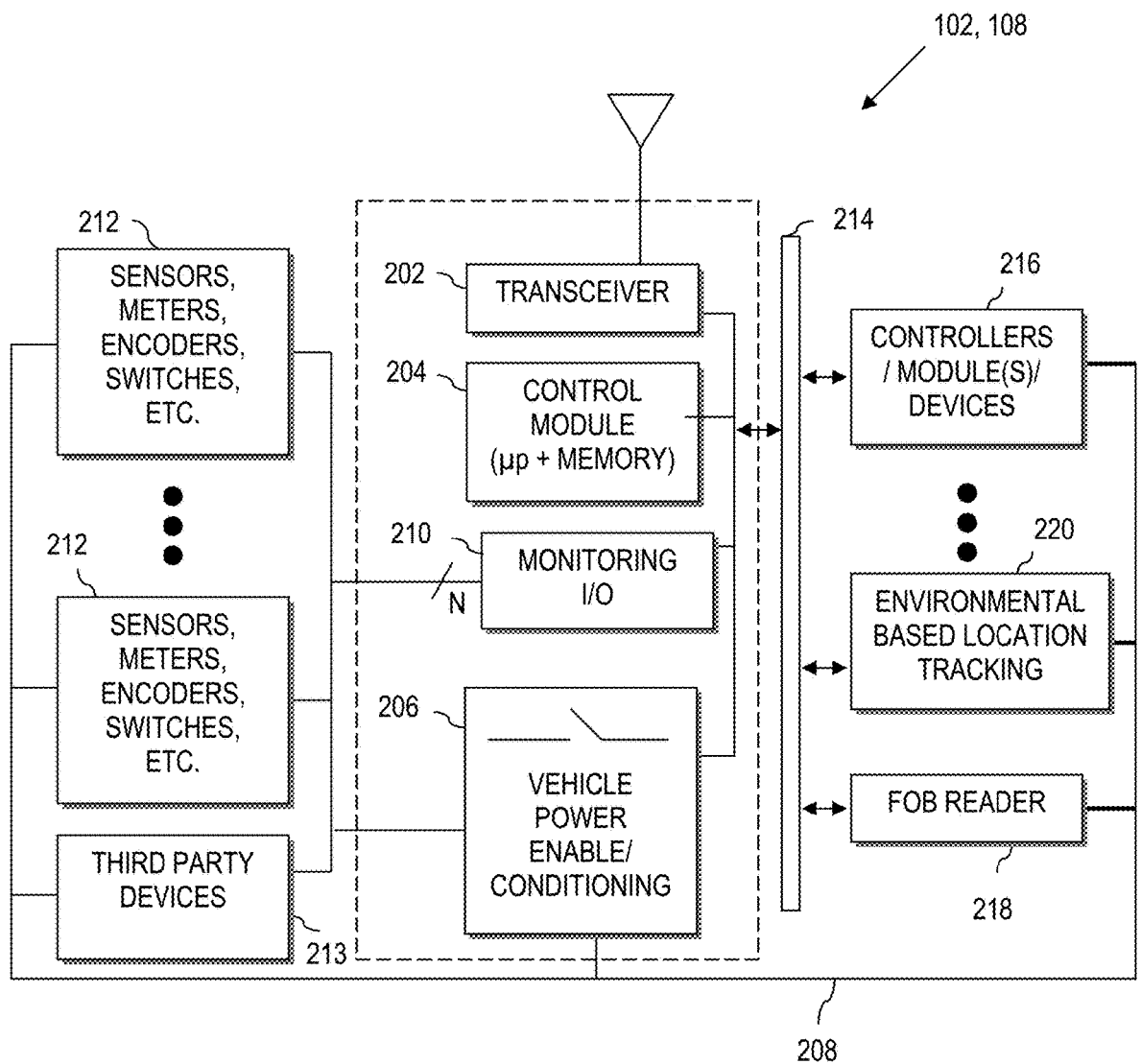
FIG. 2 is a block diagram of a special purpose processing device on an industrial vehicle, which is capable of implementing geo-feature processing according to aspects of the present disclosure herein.

Referring to FIG. 2, a processing device 102 is implemented as an information linking device that comprises the necessary circuitry to implement wireless communication, data and information processing, and wired (and optionally wireless) communication to components of the industrial vehicle. As a few illustrative examples, the processing device 102 includes a transceiver 202 for wireless communication. Although a single transceiver 202 is illustrated for convenience, in practice, one or more wireless communication technologies may be provided. For instance, the transceiver 202 may be able to communicate with a remote server, e.g., server 112 and hence, interact with the analysis engine 114 of FIG. 1, via 802.11.xx across the access points 110 of FIG. 1. The transceiver 202 may also optionally support other wireless communication, such as cellular, Bluetooth, infrared (IR) or any other technology or combination of technologies. For instance, using a cellular to IP bridge, the transceiver 202 may be able to use a cellular signal to communicate directly with a remote server, e.g., a manufacturer server.

The processing device 102 also comprises a control module 204, having a processor coupled to memory for implementing computer instructions, including the relevant processes, or aspects thereof, e.g., as set out and described more fully herein with reference to FIGS. 3-11. In this regard, the processor of the control module 204 can interact with the analysis engine 114 (FIG. 1) in carrying out one or more features described herein with reference to FIGS. 3-11. Additionally, the control module 204 implements processes such as operator log on, pre-use inspection checklists, data monitoring and other features, examples of which are described more fully in U.S. Pat. No. 8,060,400 to Wellman, already incorporated by reference herein.

The processing device 102 further includes vehicle power enabling circuitry 206 to selectively enable or disable the industrial vehicle 108. In certain implementations, the vehicle power enabling circuitry 206 can partially enable the industrial vehicle 108 for operation, or fully enable the industrial vehicle 108 for operation, e.g., depending upon proper operator login. For instance, the industrial vehicle power enabling circuitry 206 can provide selective power to components via power line 208. Also, the industrial vehicle power enabling circuitry 206 may be utilized by geo-features to control access to an industrial vehicle 108, e.g., to perform vehicle lock-out for violating a warehouse procedure, such as sitting idle too long in a designated area.

Still further, the processing device 102 includes a monitoring input output (I/O) module 210 to communicate via wired or wireless connection to peripheral devices mounted to or otherwise on the industrial vehicle, such as sensors, meters, encoders, switches, etc. (collectively represented by reference numeral 212). The processing device 102 may also be connected to other devices, e.g., third party devices 213 such as RFID scanners, displays, meters or other devices.

The processing device 102 is coupled to and/or communicates with other industrial vehicle system components via a suitable industrial vehicle network system 214, e.g., a vehicle network bus. The industrial vehicle network system 214 is any wired or wireless network, bus or other communications capability that allows electronic components of the industrial vehicle 108 to communicate with each other. As an example, the industrial vehicle network system may comprise a controller area network (CAN) bus, ZigBee, Bluetooth, Local Interconnect Network (LIN), time-triggered data-bus protocol (TTP) or other suitable communication strategy.

As will be described more fully herein, utilization of the industrial vehicle network system 214 enables seamless integration of the components of the processing device 102 on the industrial vehicle 108 into the native electronics including controllers of the industrial vehicle 108. Moreover, the monitoring I/O 210 can bridge any electronic peripheral devices 212 to the industrial vehicle network system 214. For instance, as illustrated, the processing device 102 connects with, understands and is capable of communication with native vehicle components, such as controllers, modules, devices, bus enabled sensors, displays, lights, light bars, sound generating devices, headsets, microphones, haptic devices, etc. (collectively referred to by reference 216).

The processing device 102 can also communicate with a FOB 218 (or keypad, card reader or any other device) for receiving operator log in identification. Still further, the processing device 102 can include a display and/or other features to provide desired processing capability.

According to yet further aspects of the present disclosure, an environmental based location tracking device 220 may be provided on the industrial vehicle 108, which can communicate across the industrial vehicle network system 214. The environmental based location tracking device 220 enables the industrial vehicle 108 to be spatially aware of its location within the warehouse. The environmental based location tracking device 220 can comprise a local awareness system that utilizes markers, including RFID, beacons, lights, or other external devices to allow spatial awareness within the warehouse environment. The environmental based location tracking system 220 may use one or more of a global positioning system (GPS), or triangulation system to determine position. The environmental based location tracking system 220 may also use knowledge read from vehicle sensors, encoders, accelerometers, etc., or other system that allows location to be determined. As a further example, the environmental based location tracking system 220 may include a transponder, and the position of the industrial vehicle may be triangulated within the facility. Yet further, the environmental based location tracking system 220 may use combinations of the above and/or other technologies to determine the current (real-time) position of the industrial vehicle. As such, the position of the industrial vehicle can be continuously ascertained (e.g., every second or less) in certain implementations. Alternatively, other sampling intervals can be derived to continuously (e.g., at discrete defined time intervals, periodic or otherwise constant and recurring time intervals, intervals based upon interrupts, triggers or other measures) determine industrial vehicle position over time.

Geo-Feature Creation:

According to various aspects of the present disclosure, geo-features are created in a virtual environment, and are deployed in a corresponding physical environment where industrial vehicles operate. As will be described in greater detail herein, geo-features are features that are created and administered through an electronic means. In certain implementations, the geo-features are defined by a graphical user interface in a virtual environment that resembles or otherwise represents the actual environment in which the industrial vehicles operate. The virtualization aspect of a virtual environment is not required, but is convenient for the user setting up the geo-features. Alternatively, geo-features can be created using command prompts or other programming techniques. In certain implementations, the geo-features can be set up, taken down, or otherwise modified in an ad-hoc manner. Moreover, geo-features are not purely limited to spatial position. Rather, geo-features may be enabled or disabled based upon the type of industrial vehicle, the operator, the time of day, operating conditions of an industrial vehicle encountering the geo-feature, the state of processes in various warehouse operational domains, or based upon other factors, examples of which are set out in greater detail herein.

Figure 3:
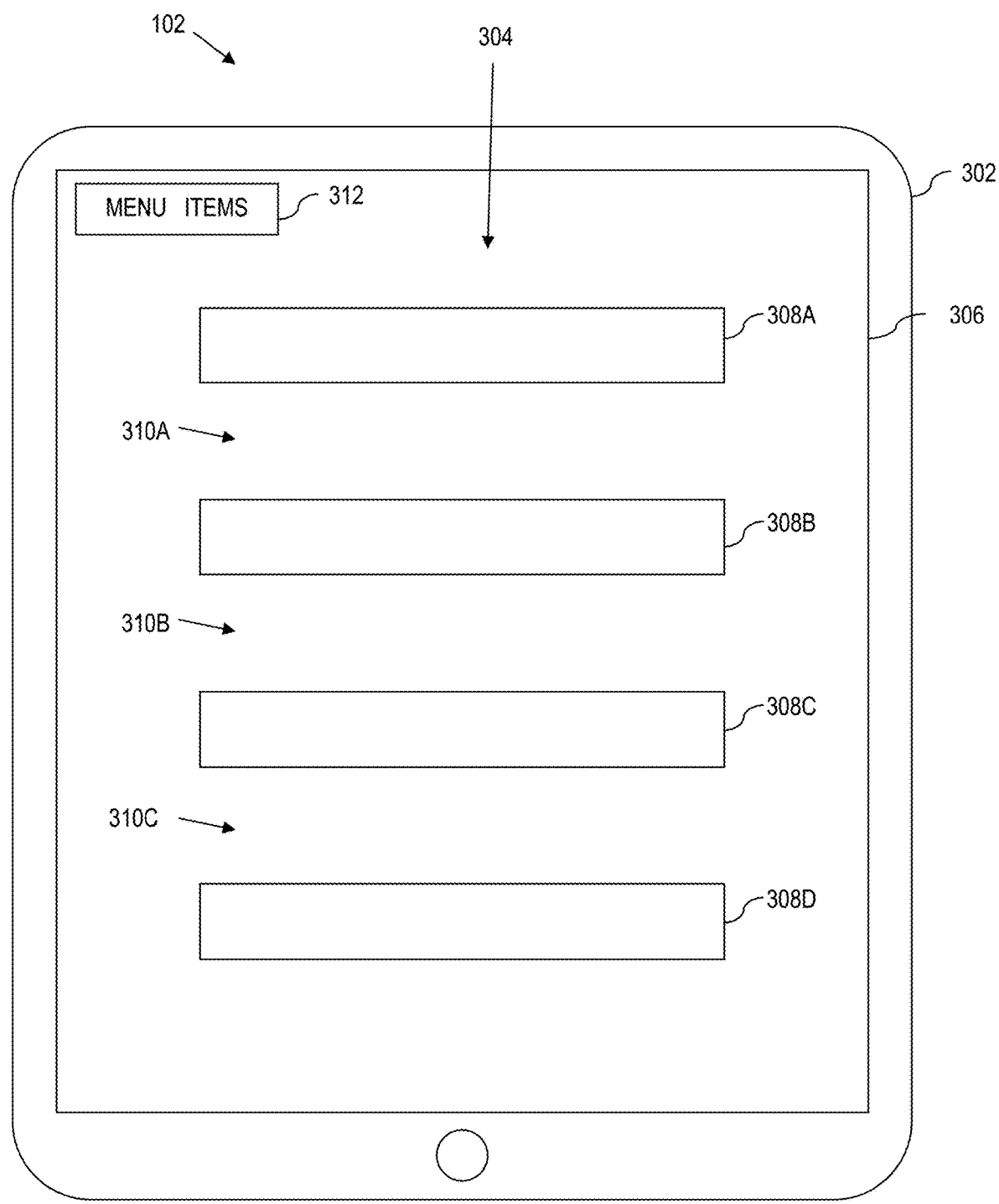
FIG. 3 illustrates a graphical user interface executing on a tablet computer that is specifically configured for setting up geo-features within a bounded environment, such as a warehouse, according to aspects of the present disclosure herein.

Referring now to FIG. 3, a processing device 102 is illustrated, which can be utilized with any of the components and configurations described with regard to FIG. 1. The processing device 102 is illustrated in the form factor of a physical, hardware tablet computer 302, and is implemented as a hardware computing device configured to execute computer code to generate a graphical user interface 304 for interacting with industrial vehicles.

The graphical user interface 304 presents a model 306 depicting a graphical representation of a virtual environment that corresponds to a physical environment, where the physical environment is contained within a bounded or otherwise limited physical environment, such as a warehouse. In this regard, a typical warehouse is a large building that includes rows of racking. Each row of racking typically includes several vertically spaced rows of bins, each bin holding one or more pallets. Goods that are stored in the warehouse are typically loaded onto the pallets and are thus temporarily stored in the bins. Warehouses also typically include travel aisles or lanes for industrial vehicles (e.g., forklifts) to navigate in order to place and retrieve pallets in corresponding bins. Warehouses also typically include lanes designated for shipping, receiving, inspection, or other purposes. Yet further, warehouses may have designated regions that are intended for limited access, e.g., for storing bonded goods, for storing goods that need refrigeration, break rooms, sorting areas, packing areas, maintenance areas, etc. The above features of a typical warehouse are not meant to be exhaustive, and other features may be present in an actual implementation.

As such, the model 306 may be a two-dimensional map of the warehouse, or the model 306 may be a three-dimensional model of the warehouse, e.g., to properly map not only the floor plan of the warehouse, but also to account for racking, height, doorways, rooms, and other three-dimensional features within the warehouse.

In a simplified example for sake of discussion herein, the model 306 depicts rows of racking 308A, 308B, 308C, 308D. A first aisle 310A extends between racking 308A and 308B. A second travel aisle 310B extends between racking 308B and 308C. A third travel aisle 310C extends between 308C and 310D, etc. Of course, in practice, the model 306 can support any structures that are present in the real corresponding warehouse, and thus the model 306 is not limited to racking 308 and aisles 310. Moreover, for each modeled element, data may be recorded, such as X, Y, Z coordinates, dimensions, etc. Still further, menu items 312 may be provided to launch dialog boxes to collect data about the definition of the model 306, of created geo-features, etc.

Figure 4A:
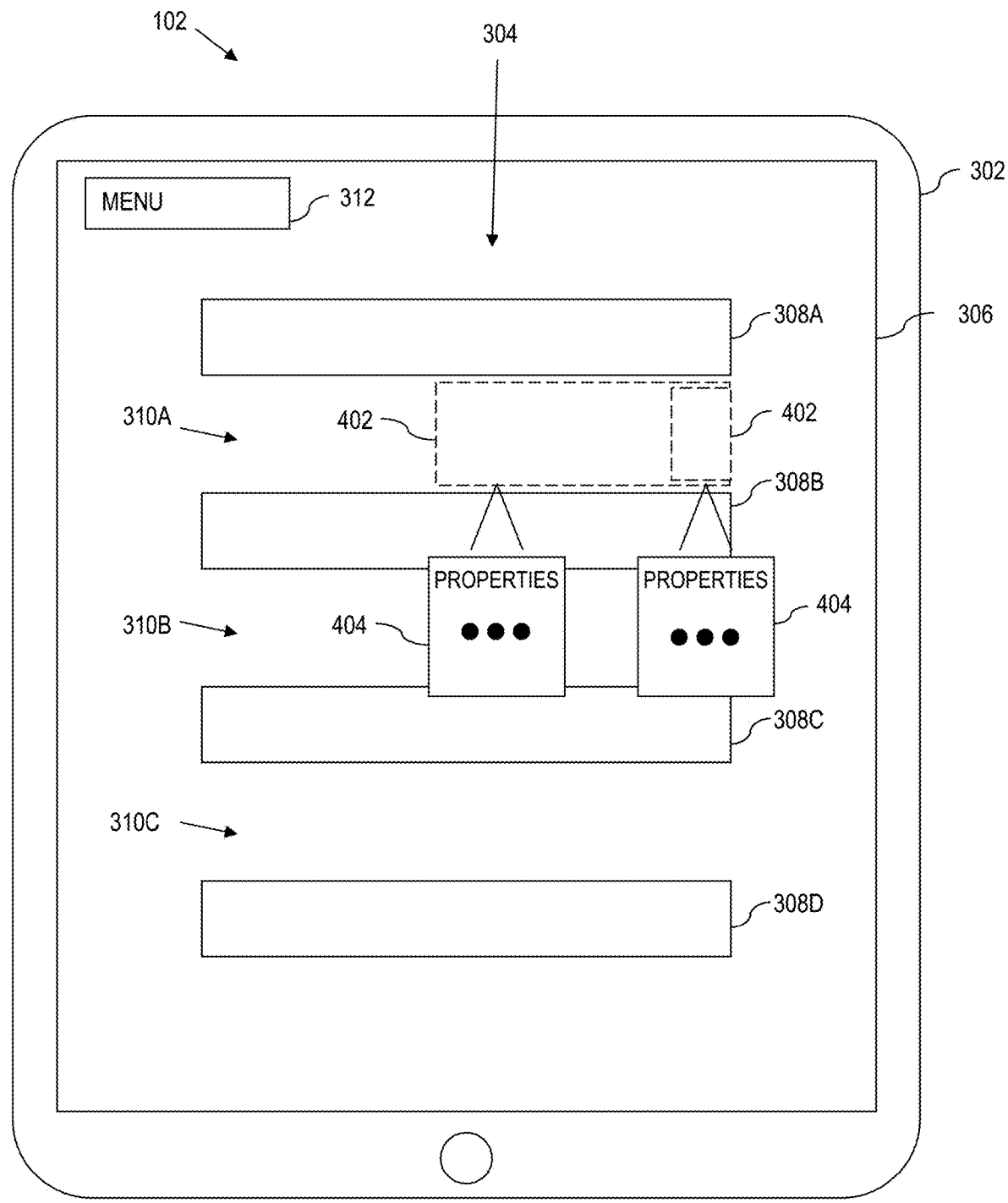
FIG. 4A is the graphical user interface of FIG. 3 illustrating the creation of geo-features, according to aspects of the present disclosure herein.

Location-Based Setup:

Referring to FIG. 4A, the hardware tablet computer 302 executes the graphical user interface 304 to provide a tool that enables a user to define a geo-feature 402 at a location on the model 306. A geo-feature 402 is not limited to pure fixed spatial positioning however. For instance, a geo-feature 402 can be drawn around a virtual industrial vehicle or other virtual movable warehouse component corresponding to an actual industrial vehicle 108 or other actual movable warehouse component, as will be described in greater detail herein. Notably however, many types of geo-features 402 are location dependent.

Accordingly, as used herein, a geo-feature 402 can correspond to an element, zone, location, event, or other definable element within the virtual environment. In the example implementation, the geo-feature transforms into an industrial vehicle control in the corresponding physical environment such that an event triggers a corresponding action on an industrial vehicle 108 within the corresponding physical environment when the industrial vehicle 108 encounters the geo-feature 402, as will be described in greater detail herein.

As used herein, an industrial vehicle control is a signal processed by an industrial vehicle 108 in response to encountering a geo-feature. The industrial vehicle 108 can receive the signal, such as via a wireless transmission from a server (e.g., server 112 of FIG. 1) or other source. The industrial vehicle 108 can alternatively generate the signal, such as where geo-feature detection is carried out locally on the industrial vehicle itself, such as by using an environmental based location tracking system 220. Regardless, the industrial vehicle control carried out in response to the signal may be in the form of an alert, e.g., by initiating a light, display, prompt with a textual message, sound, speech based audible message, haptic response, combination thereof, etc. The industrial vehicle control may also take the form of an operational control, e.g., to perform an automation or other operational function. Still further, the industrial vehicle control may be in the form of a modification to a vehicle operational parameter, e.g., to set a speed limit, force a travel direction, limit the maximum fork height, etc., examples of which are set out in greater detail herein.

To facilitate customization of geo-features 402, the graphical user interface 304 opens a dialog box 404 that enables the user to enter geo-feature information. The geo-feature information encompasses information necessary to electronically characterize the geo-feature 402. (The dialog box 404 can also optionally be selected from the menu 312).

For instance, as illustrated, the geo-feature information is collected as a set of properties. The properties can include a parameter (or parameters) that defines (define) at least a function, characteristic, or action of the defined geo-feature. The nature of the specific geo-feature will dictate the geo-feature information.

However, as a few illustrative examples, a parameter may comprise coordinates of the geo-feature 402 or other data indicating the spatial location of the geo-feature 402 (in two-dimensions or three-dimensions). A parameter may also be used to specify the type of geo-feature 402. By way of example, a geo-feature 402 may be a geo-zone. Moreover, the geo-zone may be designated as a restriction zone, speed zone, control zone, height restrict zone, stop zone, horn zone, prompt zone, combination thereof, etc.

Other geo-features 402 can include for instance, a geo-feature representing a zone with lights switched on; a geo-feature pertaining to a requirement for vehicles to yield to vehicles having a right-of-way; a geo-feature for detecting a vehicle passing at a moderate or aggressive speed; and a geo-feature for detecting proximity areas or detecting avoidances that are near misses.

Yet further, geo-features 402 may also be productivity based. For instance, a geo-feature 402 can be based upon a target number of pallets or cases moved; a distance and route target per pick; a target per specific travel segment; a target per specific lift segment; a target per specific idle segment; a target for the operator being off the vehicle (e.g., time spent for picking, breaks, etc.); accuracy of correct pick or put location; efficiency of ideal travel distance per pick; excessive over-control of vehicle features; selection of the correct battery for the industrial vehicle; selection of the correct battery charger, proper queue—entering the battery queue; identifying a location of fuel run-out for internal combustion engine vehicles, etc.

As such, properties 404 are used to define the type of zone and function thereof. Still further, the properties 404 may include a parameter that defines the desired event that triggers recognition of the geo-feature 402, e.g., the detection of an industrial vehicle 108 entering a zone may be an event trigger. Other properties 404, such as leaving a zone, stopping in the zone, not stopping in the zone, vehicle condition or operating state, raising or lowering the forks in the zone, other behaviors, etc., can all define events that can be captured in the properties 404. Still further, a property 404 may comprise a control that is to be programmed into the industrial vehicle 108 when the geo-feature is encountered (such as set maximum speed to X miles per hour; set maximum fork height to Y inches to accommodate a low header in a doorway; etc.)

The properties 404 can also include parameters defined by logic, including rules, conditions, expressions, algorithms, state machines, etc., to account for dynamic conditions, static conditions, etc.

Another example type of property 404 includes a desired message or suite of messages that is/are communicated to the industrial vehicle 108 that encounters the geo-feature 402. For example, a parameter may include a positive reinforcement message if the correct operation is carried out in response to the geo-feature 402, and/or a negative reinforcement message if the incorrect operation is carried out in response to encountering the geo-feature 402. Thus, geo-feature information includes electronic information that encodes a desired outcome in response to the geo-feature 402. If that desired outcome is observed, then the positive reinforcement message is provided to the industrial vehicle 108 for conveyance at some time after the encounter with the geo-feature 402, otherwise the negative reinforcement message is provided at some time after the encounter with the geo-feature 402.

As another example, a geo-feature 402 such as a restriction zone may be drawn around a loading dock, and configured via the properties 404 so as to apply to turret stock pickers, but not for a designated loading dock sit down counterbalance forklift trucks. As such, a turret stock picker may encounter this geo-feature 402. However, the geo-feature 402 will not manifest itself to a counterbalance forklift truck that is supposed to be on the loading dock. Thus, geo-feature information can include rules, inclusions, exclusions, etc., to render the geo-feature 402 available to only select instances of industrial vehicles 108 capable of detecting the corresponding geo-feature 402. Moreover, the conditions and/or exceptions may be based upon information not directly related to the industrial vehicle 108, e.g., operator logged onto the industrial vehicle 108, time of day, shift, volume of detected or otherwise observed congestion, etc.

As another non-limiting example, geo-feature information in the form of properties 404 can be set for a geo-zone 402 such as a restriction zone drawn around bonded warehouse, but only for operators that log into an industrial vehicle 108 with improper clearance or credentials for the bonded area defined by the geo-zone.

As additional examples, a geo-feature 402 may be drawn as a restriction zone for all industrial vehicles except for vehicles having picks in the corresponding aisle based upon data in the WMS domain. For instance, the processor in the control module 204 of a select industrial vehicle 108 (FIG. 2) can interact with the analysis engine 114 of the server 112 to extract pick information from the WMS data 120 (FIG. 1), which is used to judge whether a geo-feature 402 is applicable.

As still other examples, a geo-feature 402 such as a prompt zone may only prompt an industrial vehicle 108 to slow down if the industrial vehicle 108 is traveling above a predetermined maximum speed in a designated speed zone.

As yet another example, an event may trigger the recognition of a geo-feature 402 such as a speed zone only where an industrial vehicle 108 enters the speed zone, and it is a certain time of the day, e.g., first shift, enters from a specific direction, etc.

Properties 404 may also define a desired action. Numerous example actions include a process to start or set a window around recorded events to encapsulate a record of the industrial vehicle encounter with the geo-feature 402. Here, the data logging capability of the processing device 102 on the industrial vehicle 108 can begin to aggregate industrial vehicle measurable or otherwise recordable information into a geo-feature encounter window. For example, speed, travel direction, fork height, weight on forks, operator ID, time of day, task being performed, message(s) received from the geo-feature, response/reaction thereto, and other relevant data can be data logged in a geo-feature record. This record can thus provide a complete account of the encounter with the geo-feature for subsequent auditing.

The properties 404 can also specify messaging or alerts to the industrial vehicle operator, nearby pedestrians, or both.

Yet further, properties 404 can define automation to control the industrial vehicle 108, e.g., to set limits of operation, to cause specific industrial vehicle controls to operate in a predetermined sequence, etc.

Still further, where the geo-feature 402 is a prompt zone, there may be multiple messages associated with the prompt zone, e.g., to provide critical messages, alerts, warnings, pre-action instructions, post action affirmations or negative reinforcements, etc., based upon detected conditions.

Moreover, each prompt may be tied to a different output device, e.g., via display of text, output of voice command, use of lights, sounds, haptic response, etc. For instance, a prompt zone may be configured to display the message "Stop Ahead" on a display screen so long as the industrial vehicle is traveling less than a predetermined speed. However, the message may be "Slow Down, Stop Ahead" on the display screen where the industrial vehicle speed exceeds a predetermined threshold. Alternatively, instead of using the display screen, the system may decide to sound an audible alarm, e.g., an audible tone or flash a colored light, to serve as an indication to the industrial vehicle operator that the industrial vehicle is traveling at an excess rate of speed.

Action zones may also be configured with messages. For instance, when an industrial vehicle 108 exits a stop zone, if the industrial vehicle 108 properly stopped, a message may provide a positive affirmation "Stopped Correctly". On the other hand, if the industrial vehicle operator failed to stop properly, a negative message may be conveyed "Failed to Stop". Here, a process evaluates vehicle operating conditions and activity to determine the appropriate time after the encounter with the geo-feature 402 to provide the necessary information.

Numerous other applications can be readily contemplated and are thus within the spirit of the disclosure herein. Basically, if a property 404 can be defined by a static value, variable, rule, formula, algorithm, state machine, measure, or other determinable manner, the property can be applied to the geo-feature as geo-feature information.

Once one or more geo-features 402 are defined, the graphical user interface 304 uploads the geo-features 402. The upload may be to a server (e.g., server 112 in FIG. 1), or ultimately to the industrial vehicles 108 themselves. In an example implementation, the industrial vehicles 108 of FIG. 1 are equipped with environmental based location tracking features (see for instance 220 of FIG. 2). This allows the industrial vehicle 108 to be aware of its position, orientation, travel direction, etc., within the environment of the warehouse. In this regard the geo-features 402 (or a subset thereof) may be uploaded into the industrial vehicle 108 such that operation of the industrial vehicle 108 within the corresponding physical environment triggers the event and corresponding action when the industrial vehicle 108 encounters a physical location associated with the geo-feature 402. Thus, in this example implementation, the industrial vehicles themselves detect geo-features 402, and process all the execution requirements of the geo-feature 402 based upon geo-feature information, position information (as determined by the environmental based location tracking 220, and based upon operational (state) information regarding the current operating state of the industrial vehicle 108. The current operating state can include the state of encoders, switches, controllers, speed, direction, heading, weight on the forks, battery charge, etc.

Figure 4B:
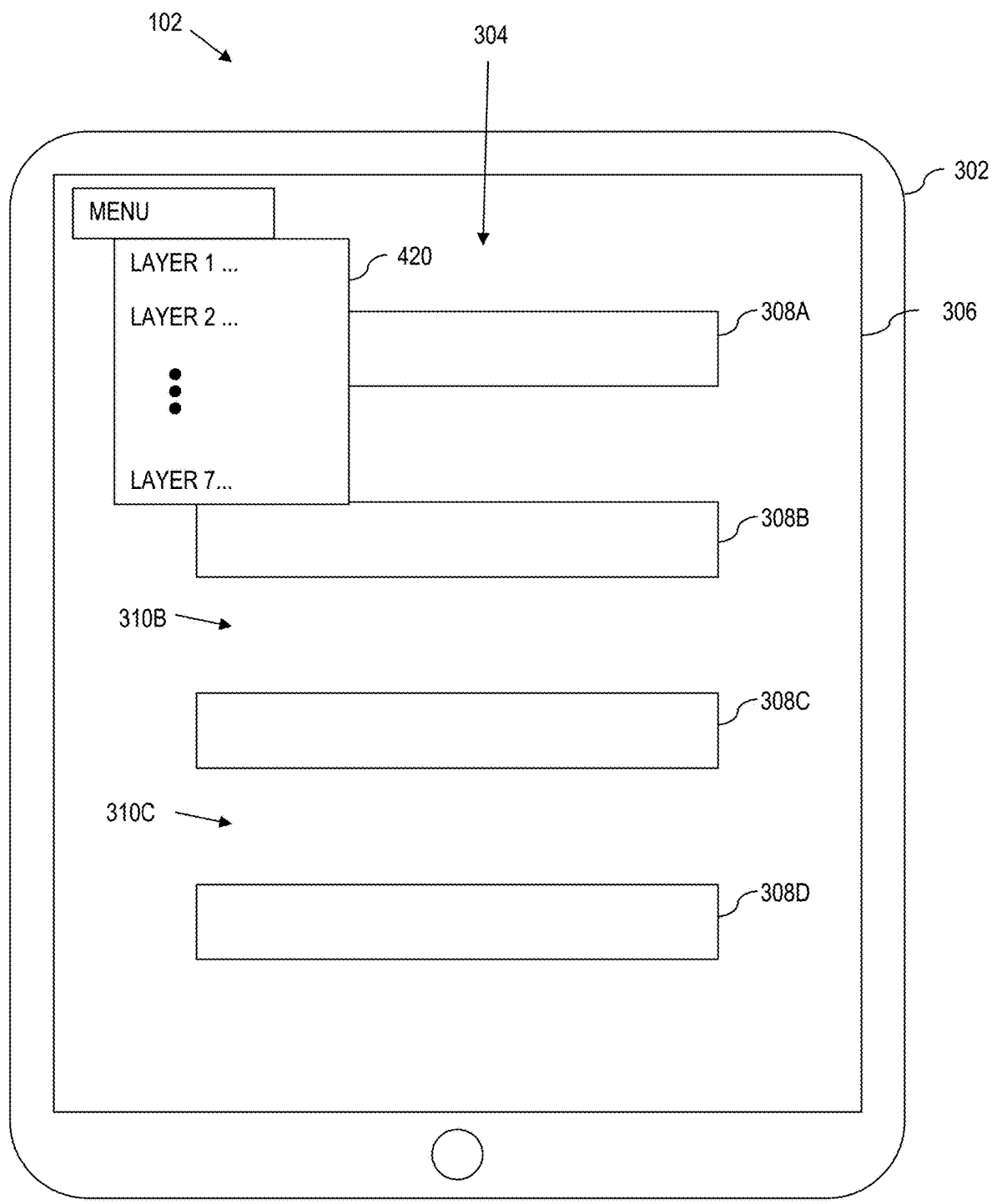
FIG. 4B is the graphical user interface of FIG. 3 illustrating the creation of layers of geo-features, according to aspects of the present disclosure herein.

Referring to FIG. 4B, there may be occasion where there are numerous geo-features. As such, the graphical user interface 304 allows the user to configure geo-features 402 in layers, e.g., using a layer menu 420. For instance, there may be geo-features that are to be utilized by all vehicles, which may be in a layer. A separate layer can be used to set up geo-features for a certain truck, type of truck, operator, type of operator, shift, team, or any other desired delineation. This allows the ability to reduce clutter on the screen. Moreover, multiple layers can be combined to overlay geo-features.

Also, setting up geo-features 402 by layers enables the user to include or not include specific properties (e.g., unique measures) for a select instance or group of instances that a geo-feature 402 is intended. For example, a geo-feature 402 such as a speed zone can have a first speed limit for first shift operators, but a second speed limit for second shift operators.

As another example, a geo-zone such as a speed zone may impose a speed restriction on all vehicles, but also require a specific operator (such as an operator-in-training) to travel in a certain direction, travel with forks lowered, not perform blending in the area etc. This ability is easily handled with layers.

Geo-features can also be set up based upon tasks to be performed, such as by integrating with a WMS system (e.g., analogous to that described above). Here, a layer provides a convenient way to organize geo-features that are task-based. Examples of task-based geo-features are described more fully herein.

Vehicle-Based Events:

The system can also be used to track and respond to events that are not location based per se. Here, vehicle based events can be detected and a response can be triggered and carried out in response to the detected event.

Figure 4C:
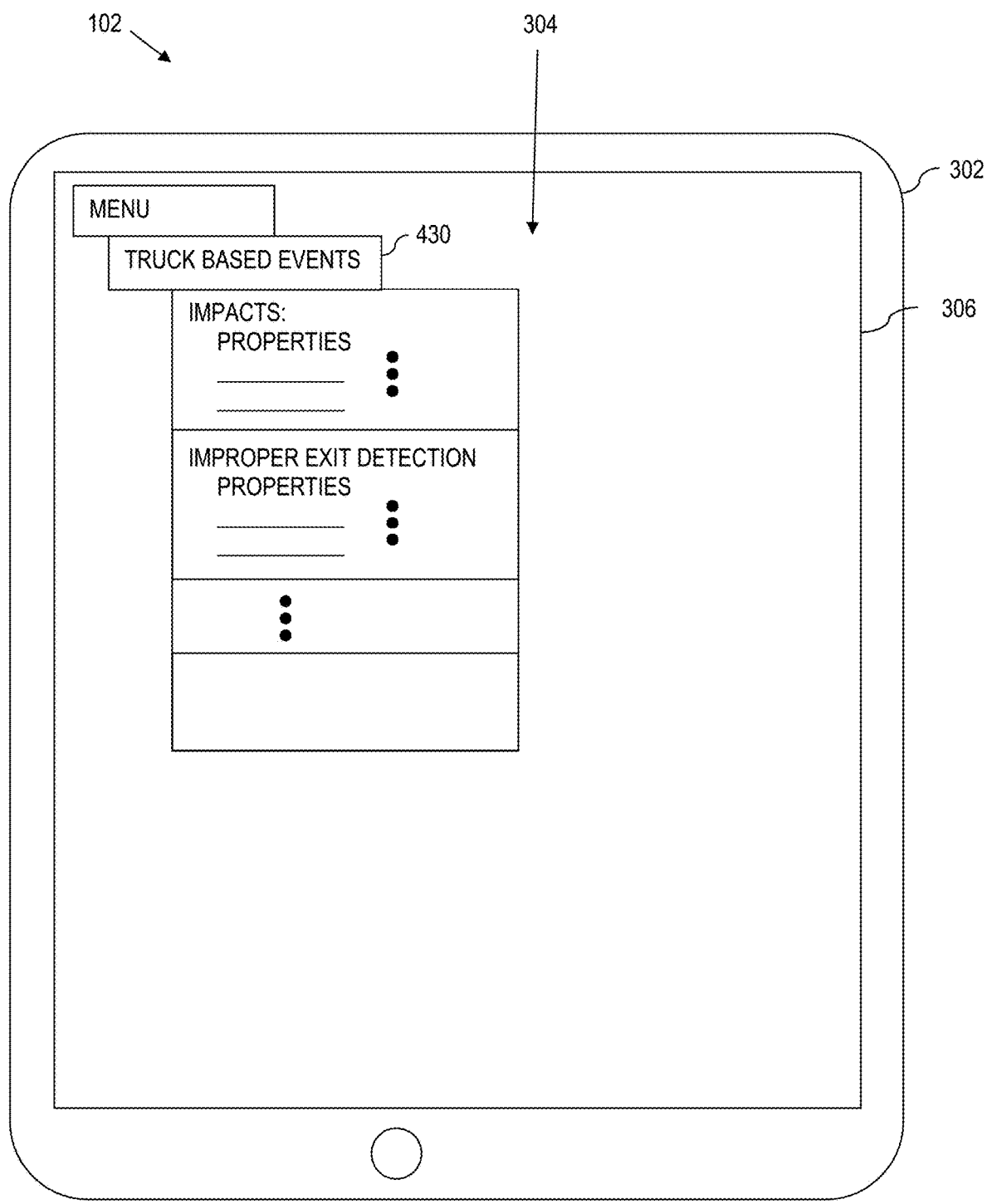
FIG. 4C is the graphical user interface of FIG. 3 illustrating the creation of events, according to aspects of the present disclosure herein.

Referring to FIG. 4C, the graphical user interface is used to set up event descriptions to capture events that are vehicle-based. However, instead of drawing a zone or identifying a feature on the model of the warehouse, the user enters information such as properties that define the event, and the desired response to the event. In the example graphical user interface 304, the user selects a truck based events drop down 430 to enter vehicle-based geo-features and properties. In this regard, the process, responses such as messaging, event recording, etc., is analogous to that of FIGS. 4A and 4B. For instance, in operation, when the event is detected, the corresponding event description can trigger geo-information to be assembled with vehicle data into an event record to capture the vehicle state and location/movement surrounding an event of interest. The event description can also include instructions to carry out a desired response, such as provide a message, feedback, take an action, etc.

A non-exhaustive list of events of interest include detecting that a checklist was completed in less time than a predetermined minimum time to complete the checklist or detecting that a checklist was completed in more time than a predetermined maximum time to complete the checklist.

Additional examples of events include detecting an impact associated with the industrial vehicle; detecting at least one of erratic steering with raised forks, fast steering with raised forks, cornering high speed with raised forks, braking suddenly with an elevated load, etc. Yet more examples include detecting at least one of exceeding a predetermined height extended travel while in free lift, the forks are extended and that the industrial vehicle is traveling with the forks elevated, that a reach is extended and that the industrial vehicle is traveling with the reach extended, etc. Still further, vehicle based events can include detecting at least one of an event where the industrial vehicle is operating with an undersized battery, the industrial vehicle is operating with an underweight battery, early or late battery charges, improper battery care, including water schedule and proper cycling, a trigger associated with a battery equalization schedule, utilization of an efficiency driving style profile, utilization of an excess of energy usage based upon a detected driving profile, the usage of a specific type of fuel usage, fuel/battery run-out events, etc.

Other example vehicle related events include by way of example, detecting excessive travel of the industrial vehicle outside typical distance, detecting that lift usage cycles of the industrial vehicle are outside a range of typical cycles, etc. Events can also comprise detecting the presence of an idle operator on a stationary industrial vehicle where the operator is logged into the industrial vehicle or an operator is logged into an industrial vehicle but is not present on the industrial vehicle; detecting that an operator exited the industrial vehicle while the industrial vehicle is still moving; detecting that a load capacity is over a predetermined capacity load limit; and detecting that the industrial vehicle is traveling on a ramp in an improper direction.

As with the examples of FIGS. 4A, 4B, the properties also include a response to the detection of the event, e.g., generation of a message, encapsulation of event data into an event record that is sent to the server 112, etc. Moreover, location information, e.g., from the environmental based location tracking 220 of FIG. 2 can be used to integrate location information into the event record to capture vehicle activity before, during and after the event, as set out in greater detail herein. Such information is also sent back to the server 112.

Figure 4D:
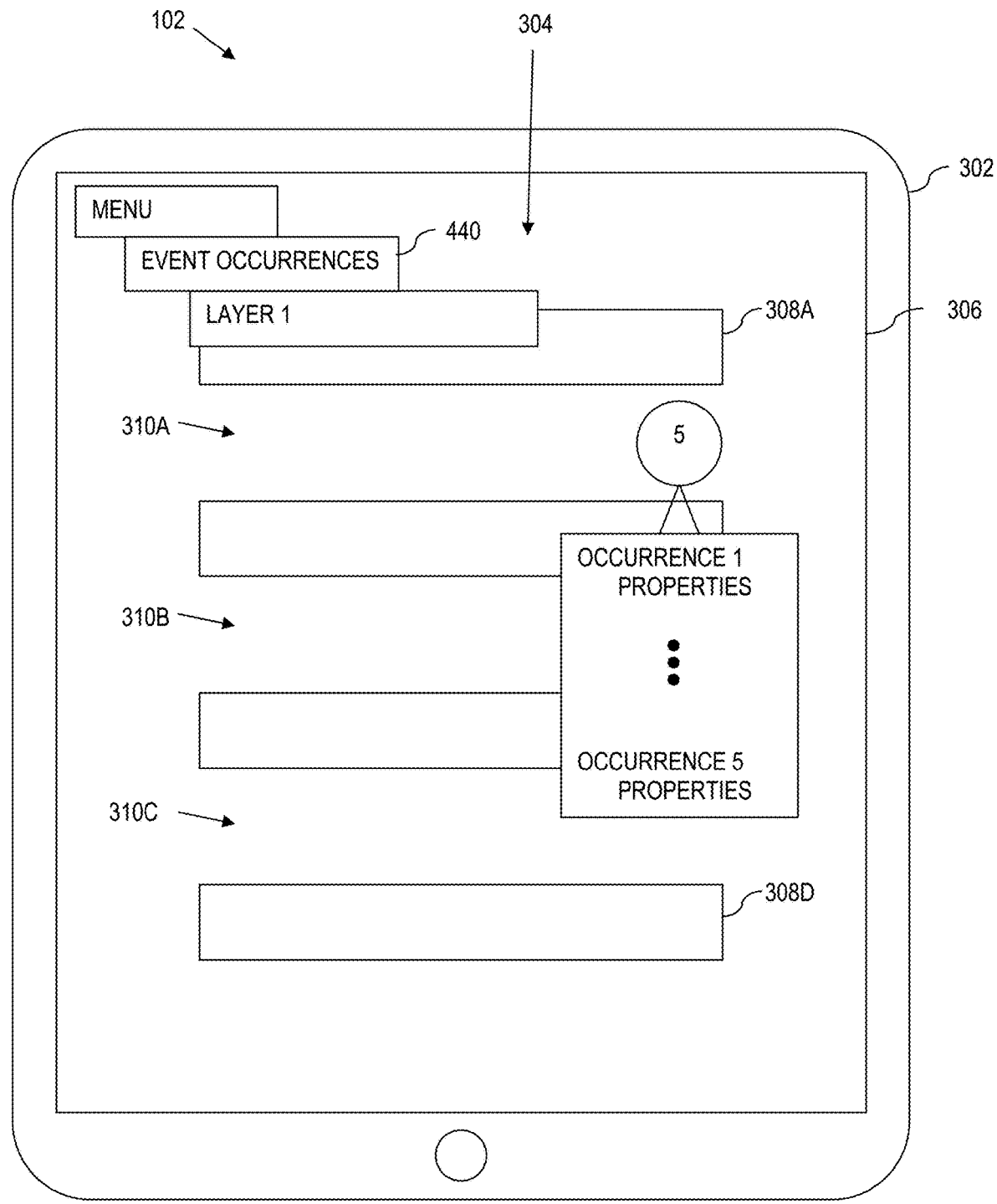
FIG. 4D is the graphical user interface of FIG. 3 illustrating the ability to identify areas where events and/or geo-features triggered the generation of an event record, according to aspects of the present disclosure herein.

Referring to FIG. 4D the graphical user interface 304 can also include one or more menus 440 to provide reports of collected event data. One such example report allows a user to navigate the model 306 (and layers where used) to identify geo-features 402 that triggered the generation of event records. The user can then select events, and review the properties associated therewith. This includes for instance, playing back simulations (as described in greater detail with reference to FIGS. 6D-6G), identifying operator data, vehicle identification data, and vehicle state data, along with other collected data in the event record. The reports can include filters, e.g., by layer, truck, truck type, date range, etc.

Figure 4E:
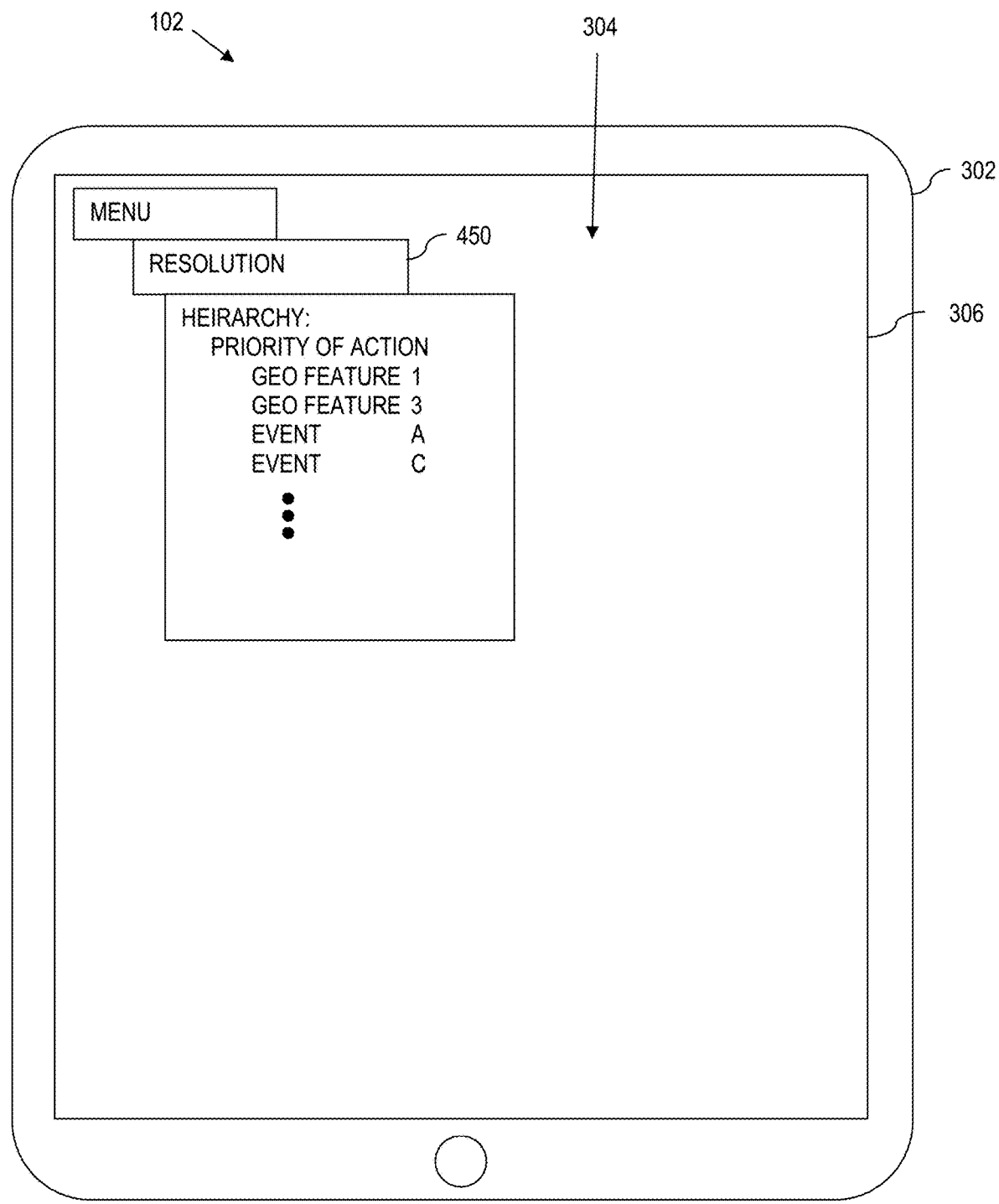
FIG. 4E is the graphical user interface of FIG. 3 illustrating ability to set a priority in case of conflicting geo-features and/or events, according to aspects of the present disclosure herein.

Referring to FIG. 4E, the graphical user interface 304 can also include a menu 450 that allows prioritization and conflict resolution where multiple geo-features 402 and/or events overlap or otherwise cause conflict. This optional feature allows the customization and prioritization of event responses. For instance, a geo-feature 402 that is higher in a hierarchy can trump, over-ride, negate, void, reinforce or otherwise modify a behavior relative to a geo-feature lower in the hierarchy.

Figure 5:
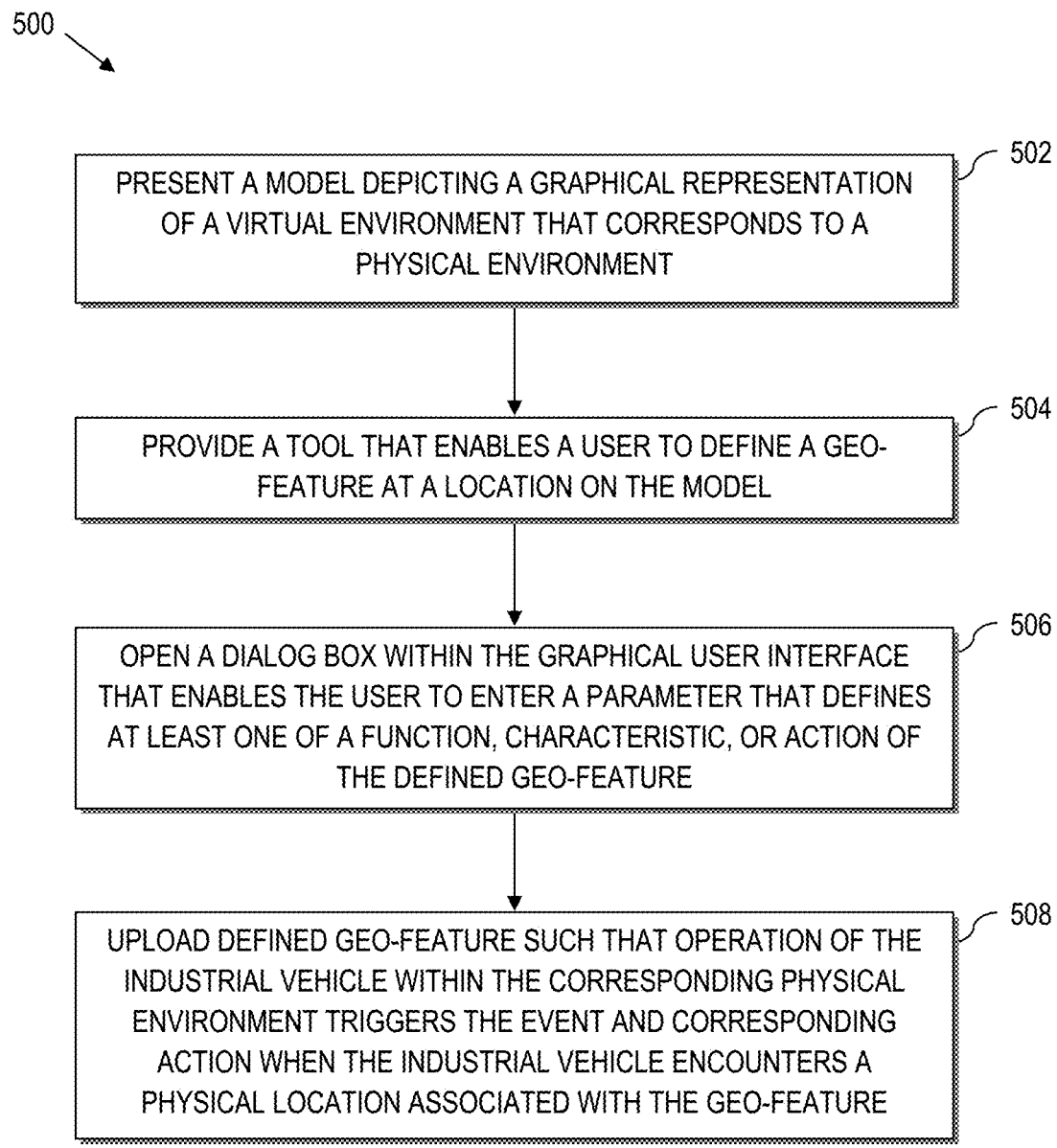
FIG. 5 is a flow chart of a process for creating geo-features according to aspects of the present disclosure herein.

Example Approach to Geo-Feature Deployment:

Referring to FIG. 5, a process and hardware computing device to generate a graphical user interface for interacting with industrial vehicles is provided. The approach 500 can be executed by a processor coupled to memory, where the processor executes program code stored in the memory to carry out the approach, e.g., via a processing device 102 described more fully herein.

The approach 500 comprises presenting at 502, on the graphical user interface, a model depicting a graphical representation of a virtual environment that corresponds to a physical environment, where the physical environment is contained within a bounded region. For instance, the physical environment can be contained within a bounded region such as a mapped portion of a warehouse. The approach 500 also includes providing, at 504, a tool with the graphical user interface that enables a user to define a geo-feature at a location on the model. Here, the geo-feature corresponds to an element within the virtual environment that transforms into an industrial vehicle control in the corresponding physical environment such that an event triggers a corresponding action on an industrial vehicle within the corresponding physical environment when the industrial vehicle encounters the geo-feature. The approach 500 still further comprises opening, at 506, a dialog box within the graphical user interface that enables the user to enter a parameter that defines at least one of a function, characteristic, or action of the defined geo-feature. Further, the approach 500 comprises uploading, at 508, the defined geo-feature such that operation of the industrial vehicle within the corresponding physical environment triggers the event and corresponding action when the industrial vehicle encounters a physical location associated with the geo-feature.

As noted more fully herein, the tool provided with the graphical user interface can enable a user to define a geo-feature on the model by providing a tool that enables the user to draw a geo-zone on the model, where a geo-zone is an area on the model that corresponds to a desired geo-feature. Here, the user can draw any number of geo-features as zones, including for example, an action zone that defines a zone where the industrial vehicle is expected to perform a predetermined action and a prompt zone that defines a zone where the industrial vehicle is to provide a message, e.g., alert, information, or other action to bring about situational awareness.

For instance, an action zone may comprise a restriction zone that defines a zone that the industrial vehicle is to stay out of, an idle zone that defines a zone where the industrial vehicle is to remain for less than a predetermined amount of time, a speed zone that defines a zone where the industrial vehicle is to maintain a predetermined maximum speed, a control zone that defines a zone where an automation feature takes control of the industrial vehicle, a height restrict zone that defines a zone where the industrial vehicle is to maintain forks and/or the mast below a predetermined maximum height, a stop zone that defines a zone where the industrial vehicle is to stop, a horn zone that defines a zone where the industrial vehicle is to sound a horn, etc.

Referring back to FIG. 4, geo-features can be aggregated to bring out complex actions. For instance, a geo-feature 402 such as a prompt zone can be placed adjacent to an action zone to provide a message indicating the desired industrial vehicle action when the industrial vehicle encounters the adjacent action zone. As such, a warning can be provided via the prompt zone that an end of aisle stop is required. A geo-feature such as a stop zone can be placed at the end of the aisle to capture whether industrial vehicles properly stop. As another example, a geo-feature such as a horn zone can be placed on top of (or underneath) a geo-feature such as a stop zone to require two discrete actions, stop the industrial vehicle and sound the horn.

As another example, a prompt zone can overlap with an action zone so that the prompt from the prompt zone remains active during the encounter with the corresponding action zone.

Still further, the graphical user interface can open a dialog box that enables the user to enter a parameter that builds a condition for the geo-feature that is contingent upon a state of a process running in a domain associated with a task being performed by an operator of the industrial vehicle, build a condition for the geo-feature that is contingent upon a state operation of the industrial vehicle, build a condition based upon the state of other meta data, e.g., operator ID, time of day, shift, team, vehicle type, etc.

Figure 6A:
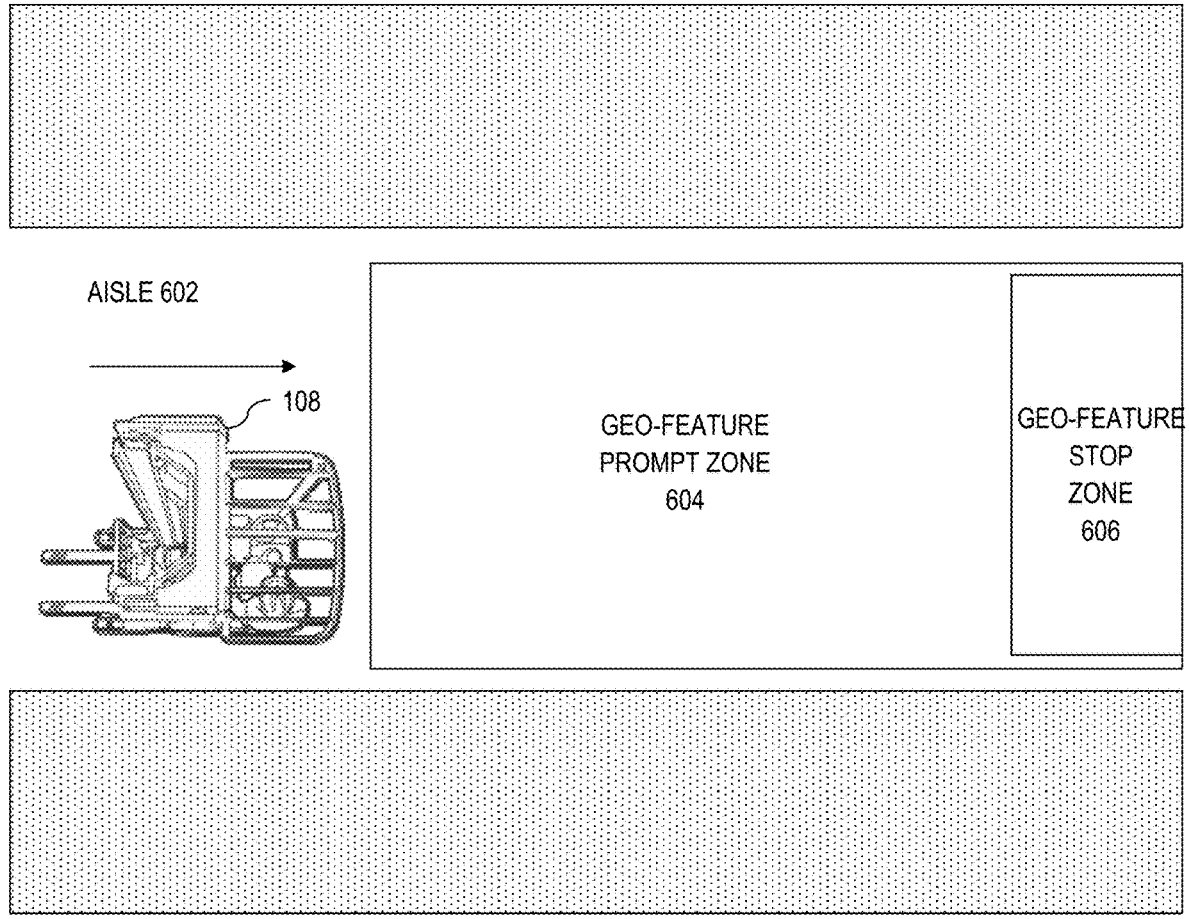
FIGS. 6A-6C illustrates an industrial vehicle improperly traveling through an intersection containing a geo-feature implemented as a stop zone, where the industrial vehicle travels through the geo-feature without stopping.

Vehicle Monitoring with Event Replay:

Referring to FIG. 6A, assume that an industrial vehicle 108 equipped to detect geo-features is traveling down an aisle 602 in the direction of the arrow directly above the industrial vehicle 108 (e.g., traveling left to right as illustrated). In this example, the industrial vehicle is about to encounter two geo-features, including a prompt zone 604 and a stop zone 606.

Figure 6B:
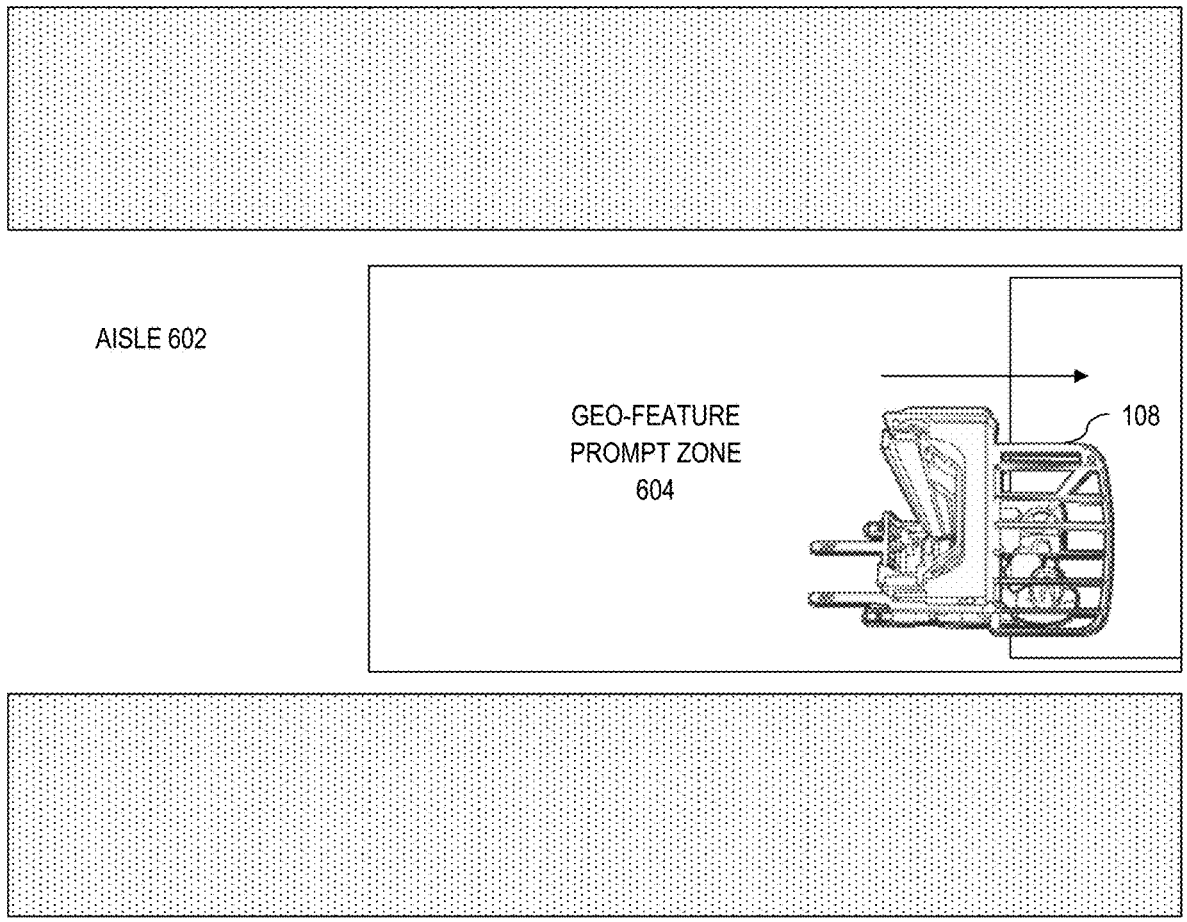

Referring to FIG. 6B, when the industrial vehicle encounters the prompt zone 604, the industrial vehicle processes the prompt zone information. In this example, the industrial vehicle 108 conveys a prompt to the vehicle operator "STOP AHEAD". Because of the overlap of the prompt zone 604 and the stop zone 606, the prompt will persist until the industrial vehicle exits the stop zone. Color can be used in the display to indicate the message as being informational. The occurrence of this event is documented in one or more event records that are communicated back to the server 112.

If the industrial vehicle 108 would have come to a complete stop at the stop zone, then either a positive reinforcement message may be displayed, or no message is displayed. However, assume for this example that the operator did not stop.

Figure 6C:
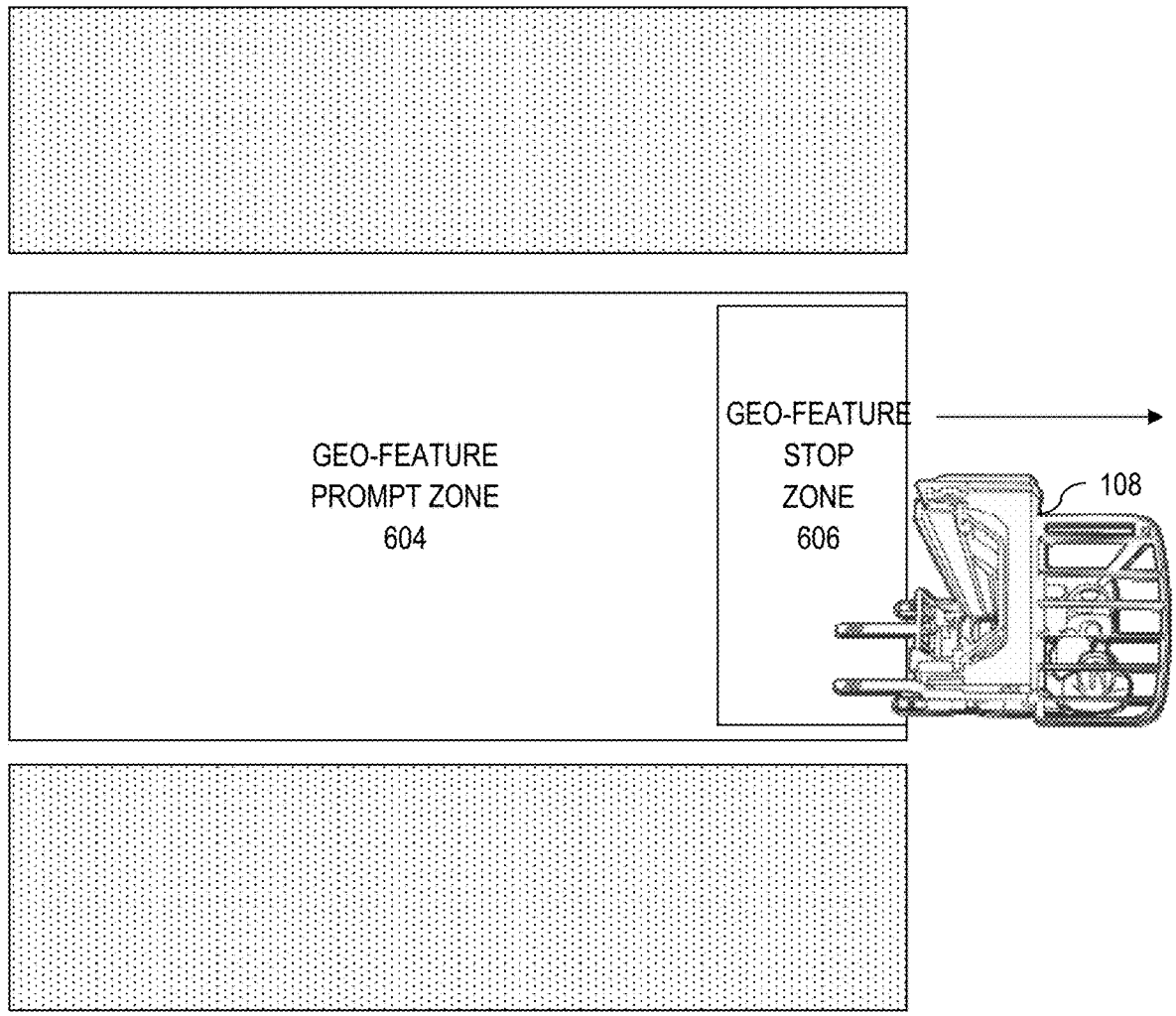
Figure 6D:
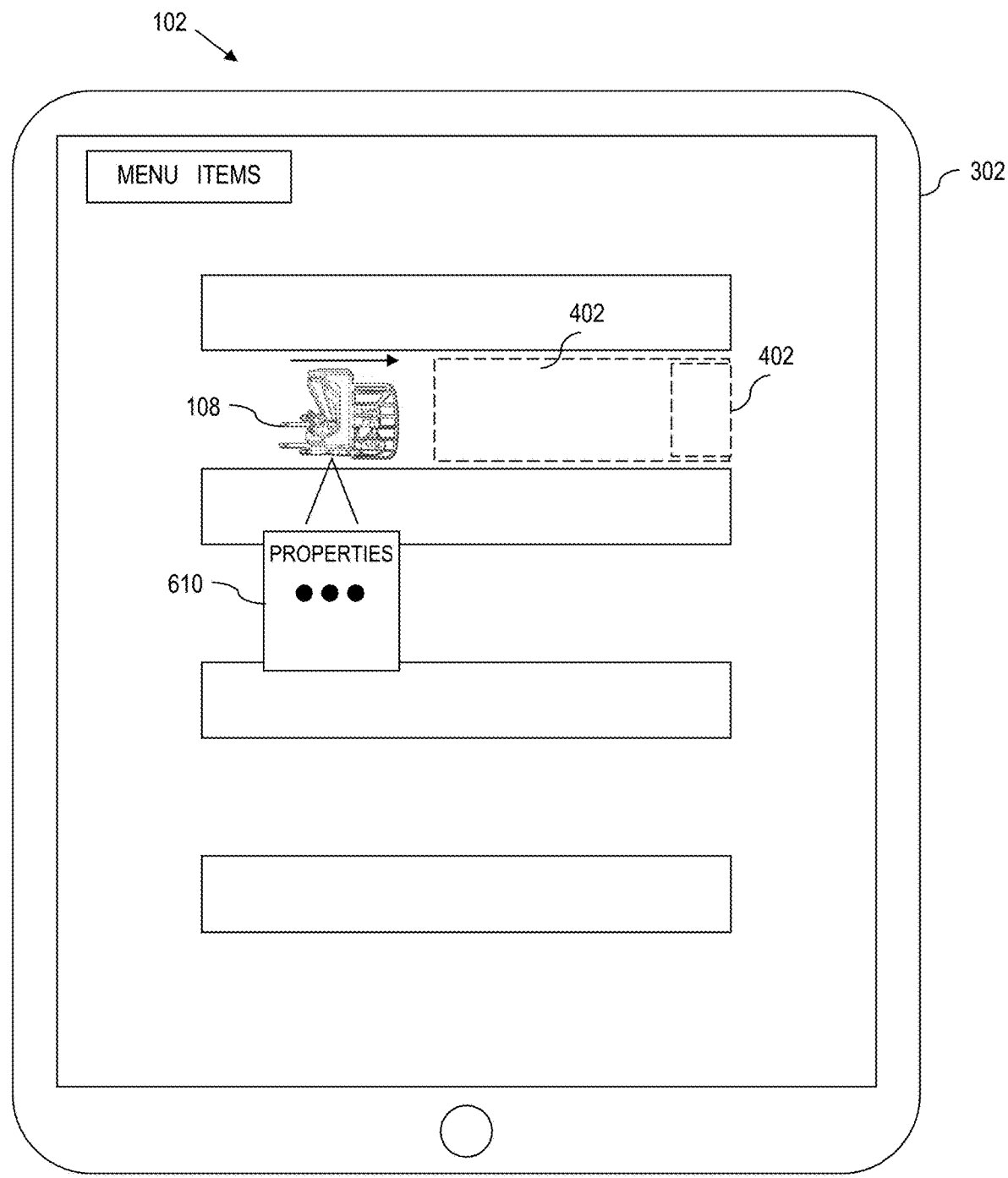
FIGS. 6D-6G illustrates a graphical user interface that is re-playing a recorded event of the industrial vehicle of FIGS. 6A-6C where an industrial vehicle encounters a geo-feature, according to aspects of the present disclosure herein.

Referring to FIG. 6C, assume the operator drove through the stop zone without bringing the industrial vehicle to a full stop. In response thereto, assume that the geo-feature information for the stop zone includes properties that trigger the industrial vehicle to issue a first, immediate response, e.g., an audible tone, flashing light, illuminated colored light, etc., indicating that the vehicle operator failed to stop. A separate conditional algorithm is also triggered that waits until predetermined conditions are met, e.g., the industrial vehicle is removed from the stop zone (e.g., 15-20 feet away), and then when the conditions are satisfied, triggers a second message, e.g., a prompt of text on a display screen that reads "FAILED TO STOP", or some other suitable message. This occurrence is documented in one or more event records that are communicated back to the server 112.

As noted in greater detail herein, in an example implementation, the encounter with the geo-features 604, 606 triggers a recording window (e.g., before, during, and after the encounter with the geo-features). This recording window captures event data associated with the encounter, and that data is sent to a remote server, e.g., server 112 in FIG. 1. By way of example, the system can capture event data, e.g., industrial vehicle truck data (e.g., speed, travel direction, fork height, fork load, etc.) operational data (e.g., time of day, shift, operator ID, etc.,) information about the geo-features, etc., as an industrial vehicle encounters one or more geo-features. In an illustrative example, the system captures over 10 seconds of data before encountering a geo-feature, and continues to data log until over 10 sections after the engagement with the geo-feature ceases. In this regard, the system can capture the properties associated with the geo-features, and how the industrial vehicle reacts thereto. Other time windows can be used to capture data before, during, and after the encounter with a geo-feature, e.g., using a rolling window recorder, circular buffer, etc.

Once the server received the record, the server determines that an improper behavior was noted. As such, the server can send a message to a manager, supervisor, etc. via instant messaging, email or other form to raise an awareness of the infraction.

The manager, supervisor, etc., can then replay a simulation of the event based upon the record sent to the server.

Replay:

The model displayed by the graphical user interface can be used to display an "event density map" (e.g., FIG. 4D) of areas of the warehouse where improper actions were taken in response to geo-features, events, or combinations thereof. As such, a user can select an area, select an event, etc. and replay the associated event record to see the details of the event.

By way of example, referring to FIGS. 6D-6G, the graphical user interface uses the created model to play back simulations of actual industrial vehicle movement and industrial vehicle interaction with geo-features (e.g., based upon data collected by the server 112).

By way of illustration and not by way of limitation, assume that an operator improperly turned at an end of aisle without properly stopping, as described with reference to FIGS. 6A-6C. A manager, supervisor, etc., can replay the event to see exactly what happened and what the conditions were surrounding the event. As illustrated at 6D, as the industrial vehicle 108 approaches the first geo-feature 402 (a prompt zone representing the geo-feature 602 in the physical environment), appropriate properties 610 (event data at a slice of time) of the event can be displayed (e.g., speed, travel direction, fork height, etc.).

Figure 6E:
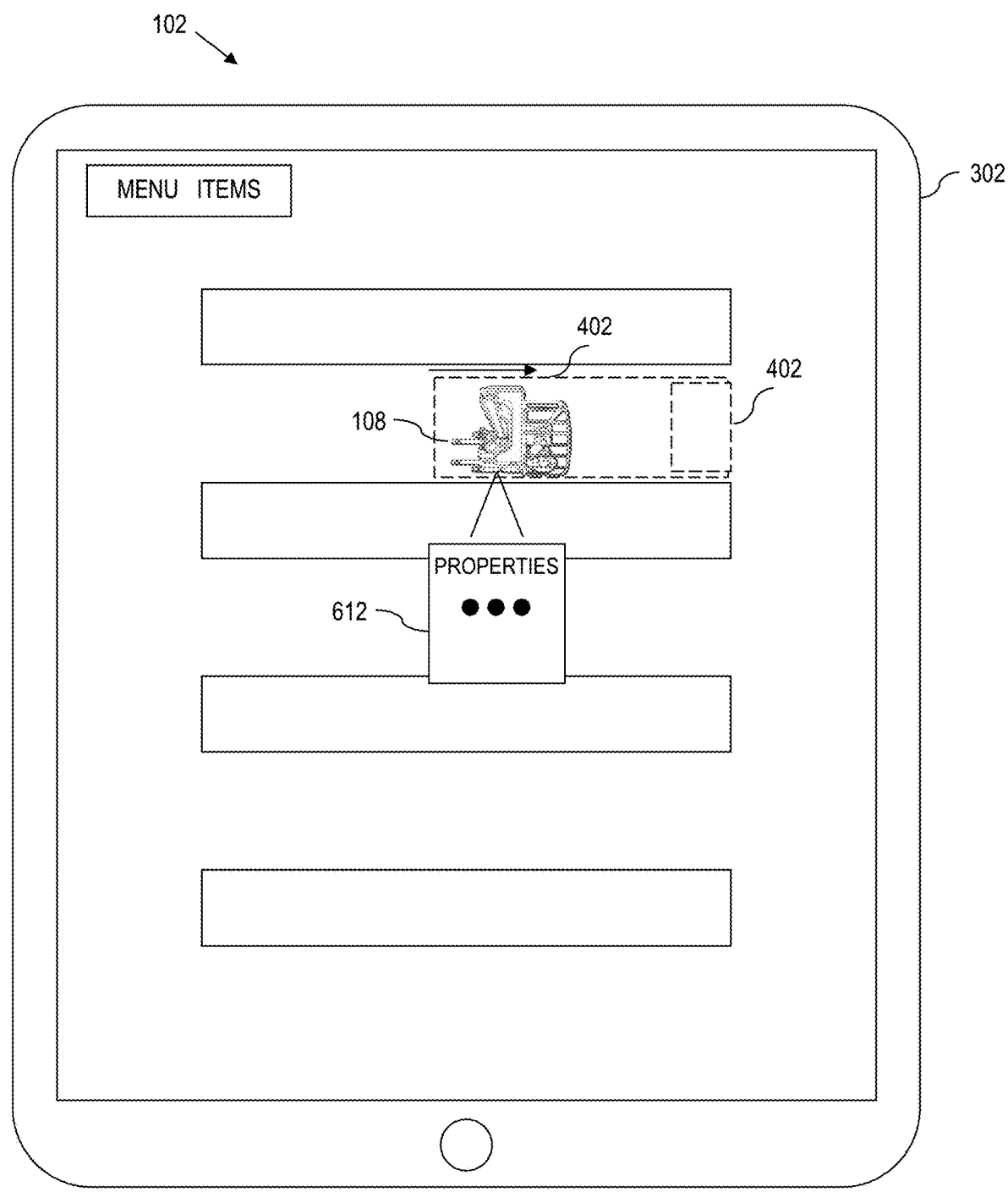

With reference to FIG. 6E, the industrial vehicle 108 encounters the first geo-feature 402 (e.g., a prompt zone). Digging into the properties 612, it can be seen that prompt message "STOP AHEAD" was provided to the operator. This may be carried out by an audible message, voice message, text message on a display screen, light from a light bar or display screen, haptic response, etc., as noted in greater detail herein. The event parameters represent the recorded event data later in time compared to the properties 610 of FIG. 6D. Thus, one can determine whether the operator attempted to slow down in response to the prompt by comparing the vehicle speed in the properties 610 of FIG. 6D to the vehicle speed in the properties of FIG. 6E.

Figure 6F:
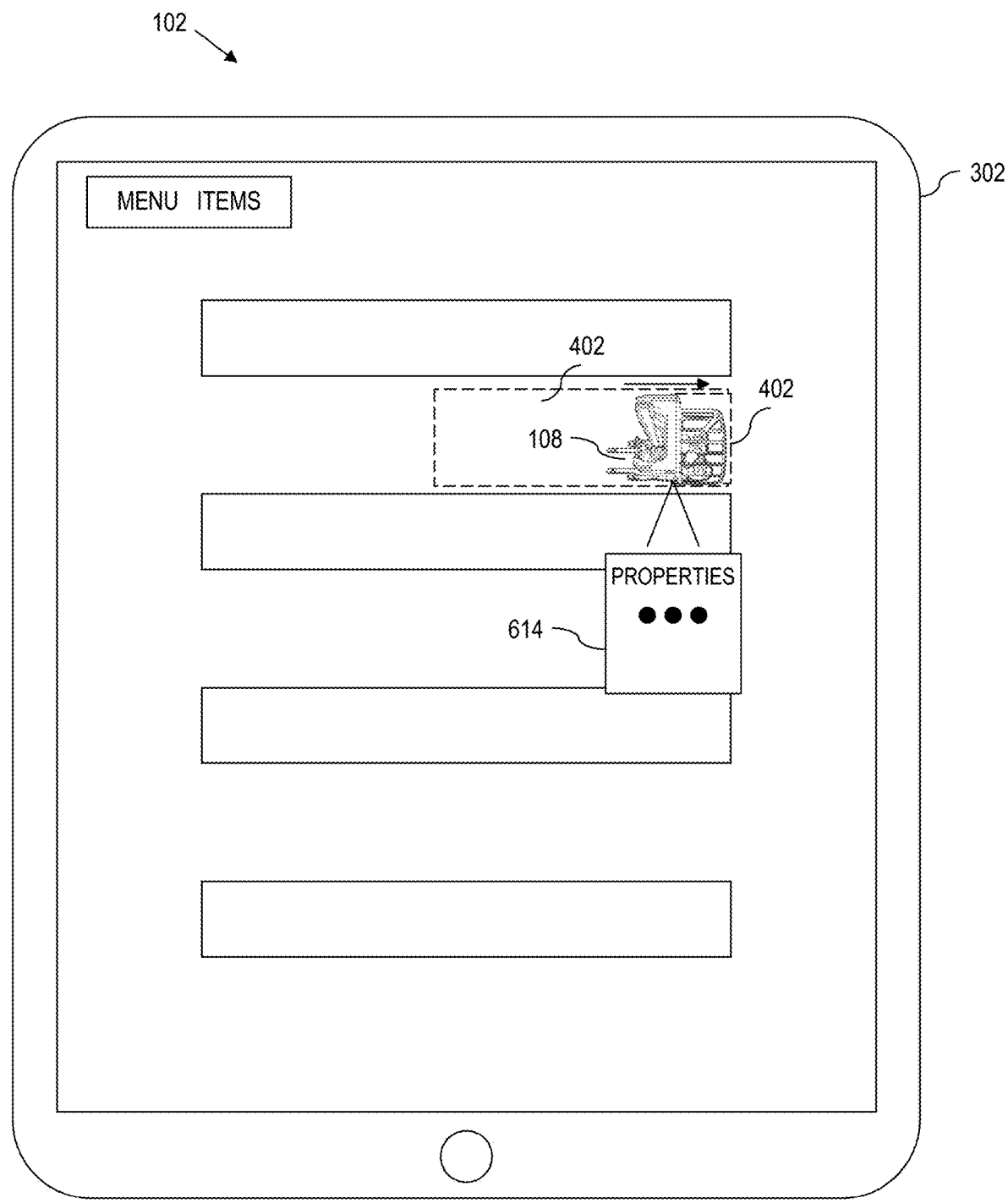

In FIG. 6F, the industrial vehicle 108 exits the first geo-feature 402, and now enters a second geo-feature, i.e., stop zone. Again, properties 614 related to the recorded event are shown. At the stop zone, the industrial vehicle is supposed to stop. As such, the system has logged data evidencing whether the operator properly stopped.

Figure 6G:
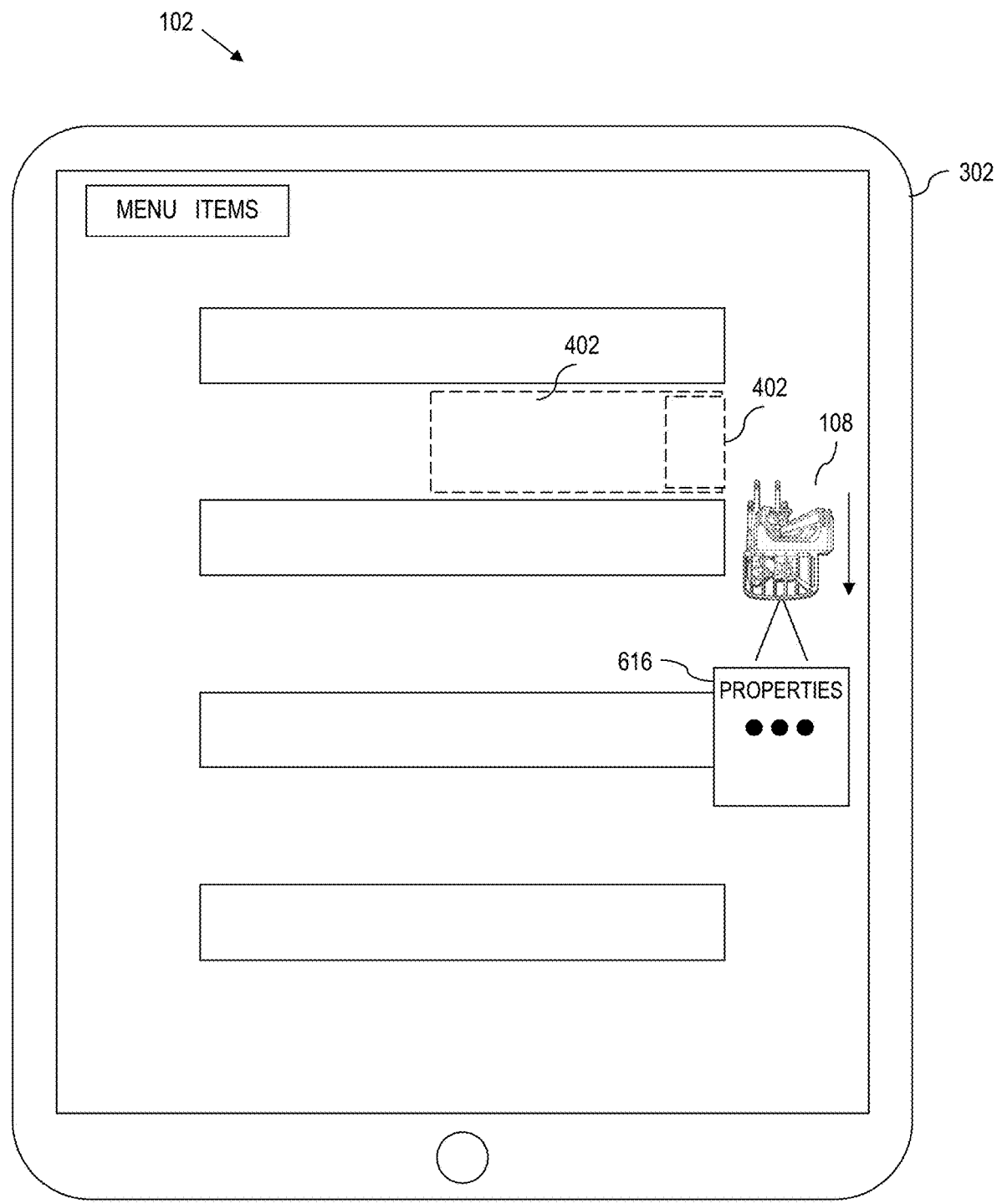

In FIG. 6G, the replay of the action of the industrial vehicle 108 continues through the geo-feature of interest. Again, properties 616 of the event can be displayed. Here, the properties show that the industrial vehicle failed to stop and that a negative reinforcement message was displayed, e.g., a message "FAILED TO STOP" was presented to the vehicle operator.

Failure to demonstrate appropriate actions in response to geo-features can in some embodiments, result in punitive results, e.g., the performance abilities of the industrial vehicle can be temporarily detuned until appropriate actions are demonstrated by the vehicle operator in response to the geo-feature.

Although provided in the context of a stop zone for convenience of illustration, the above can be applied to any other geo-feature types, with appropriate actions predicated by the type of geo-feature.

Thus, the system receives event data indicative of a select industrial vehicle encountering a geo-feature, provides on the graphical user interface, the model, depicts a vehicle icon as a graphical representation of the select industrial vehicle superimposed on the model, and animates the industrial vehicle icon so as to replay the event associated with the industrial vehicle encountering the geo-feature based upon event data collected from a real, physical encounter of the corresponding industrial vehicle with the geo-feature.

Moreover, the graphical user interface can provide a dialog box that presents industrial vehicle operational data recorded during the encounter with the geo-feature (e.g., based upon information communicated from the industrial vehicle 108 back to the server 112). Still further, as noted, the graphical user interface provides the animation so as to replay events recorded both before and after the select industrial vehicle actually encountered the geo-feature. Also, the graphical user interface can be used for aggregating a plurality of industrial vehicle encounters with a select geo-feature so as to display on the graphical user interface, an aggregation of data with regard to multiple industrial vehicle encounters with geo-features. Analogously, icons of vehicles can be selected to display vehicle metadata, recorded event data, operator data, timestamps, etc.

Since each encounter with a geo-feature is saved as an event record at the server, the geo-feature encounters across a fleet of vehicles can be analyzed for various purposes.

Also, in some implementations, e.g., where the industrial vehicle is equipped with a robust display, the operator may be able to use the replay feature to replay an account of an encounter with a geo-feature.

Real-Time Monitor:

Additionally, where the server 112 of FIG. 1, collects position information from the industrial vehicles, a real-time monitor can be generated. Here, an icon representing each instance of an industrial vehicle is depicted on the model. As such, a supervisor, manager, analyst, etc., can watch the industrial vehicles as they move about the warehouse. Moreover, since the model is tied to the creation of geo-features, the geo-features can also be displayed, and the parameters associated the geo-feature encounters can be displayed, in a manner analogous to those approaches set out herein.

Figure 7A:
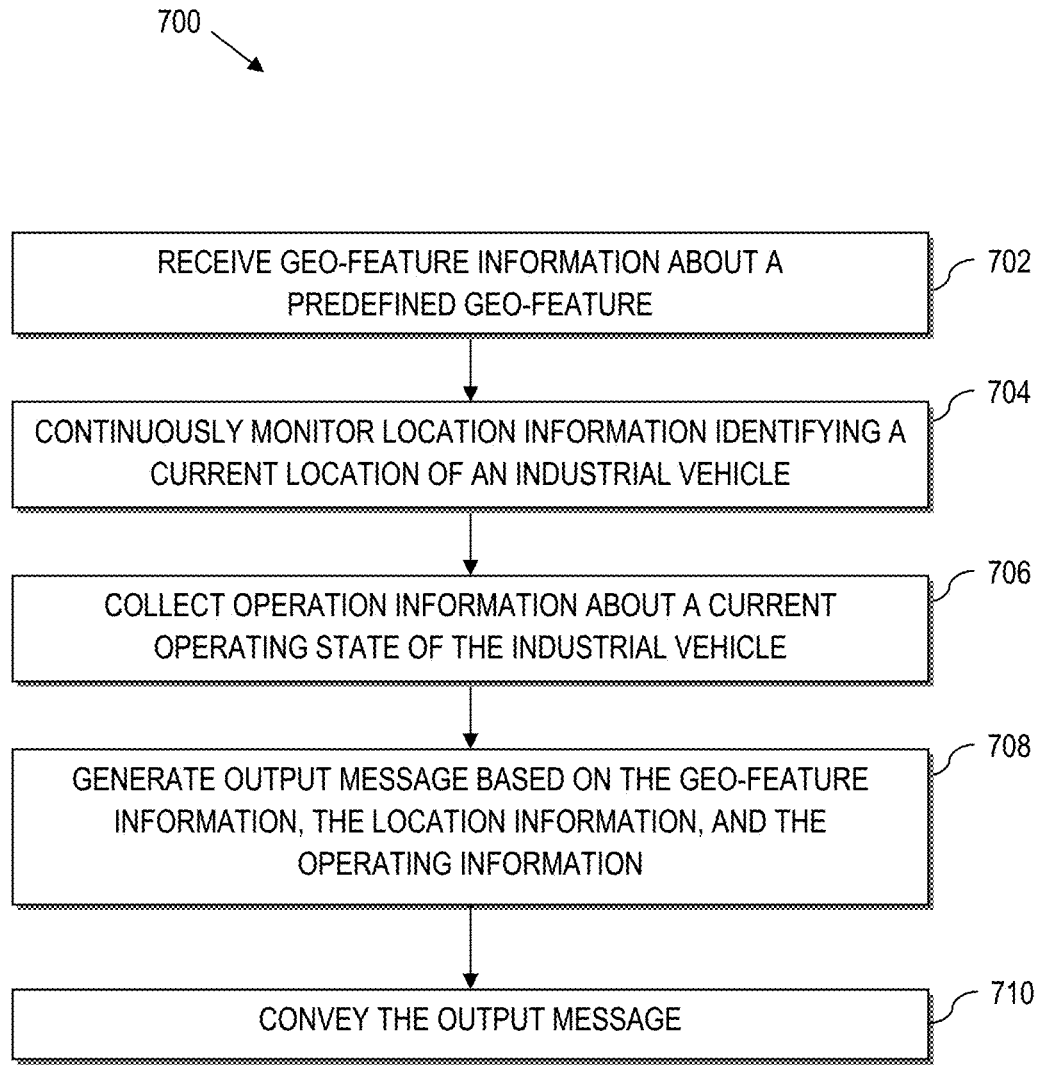
FIG. 7A is a flow chart illustrating a process for displaying a message on an industrial vehicle, according to various aspects of the present disclosure.

Industrial Vehicle Interactions with Geo-Features in the Warehouse:

Referring now to FIG. 7A, a process 700 is shown. The process 700 may be used, for instance, for conveying a message on an industrial vehicle. The process 700 can be implemented on any of the processing device 102 of FIG. 1. Moreover, the process 700 may be implemented by the purpose built computer illustrated in FIG. 2, e.g., a processor on an industrial vehicle 108.

At 702, the industrial vehicle receives geo-feature information about a predefined geo-feature. For instance, geo-feature information about a predefined geo-feature can include information about at least one of a predefined fixed geo-feature, a predefined mobile geo-feature surrounding the industrial vehicle, and a predefined mobile geo-feature identified as a geo-feature around another industrial vehicle.

The process 700 can also permit the processor on the industrial vehicle to dynamically generate a geo-feature, e.g., in response to a detected impact involving the industrial vehicle.

In an example, the geo-feature is located in an area upon which the industrial vehicle may travel, e.g., by identifying the geo-feature in a mapped portion of a warehouse. In an example configuration, a wireless transceiver (e.g., 202 of FIG. 2) is coupled to the industrial vehicle 108, and geo-feature information entered by a user at a terminal (e.g., server, workstation, mobile device, tablet etc. in any of the processes described herein) is transmitted to the industrial vehicle via the wireless transceiver (optionally through server 112 of FIG. 1).

The geo-feature information can include the geo-feature's location (e.g., absolute location within a facility, a central point and a radius, borders drawn by the user, etc.) and shape. Further, the geo-feature information can include properties as set out in greater detail herein, such as rules to determine when the geo-feature is to be encountered, a geo-feature including an expected operating state of a vehicle in the geo-feature. For example, a geo-feature may be a predefined zone, such as a prompt zone, an action zone, or both. A prompt zone is a zone where a message is conveyed upon entering the prompt zone and is usually paired with an action zone. On the other hand, an action zone is a zone where the industrial vehicle takes an action (e.g., recording an operating state and location of the industrial vehicle), responds to an action by an operator of the industrial vehicle (e.g., determines if the operator stopped properly, checks the speed of the industrial vehicle, etc.), or both. Examples of action zones include, but are not limited to: reduced-speed zones, control zones, restricted-height zones, restricted access zones, idle zones, stop zones, sound-horn zones, etc. Each action zone may have one or more message zones adjacent, overlapping, or collocated with the action zone. For example, as an operator approaches a stop zone, the operator may travel through a message zone that informs the operator to stop in the next zone.

Further, geo-feature may be a mobile zone. For example, a mobile zone may be moved throughout the facility (e.g., the mobile zone may be a zone surrounding an industrial vehicle, a pallet, etc.).

Still further, a geo-feature may be transient in nature. For example, a geo-feature can be tied to the detection of an occurrence of an impact involving the industrial vehicle. If an impact is detected, a geo-feature is created around the impact event, and processing is carried out as described in greater detail herein. By way of example, if a significant number of impacts happen at the same location, it may be that there are no actual impacts. Rather, impact sensors on industrial vehicles may be triggering due to a facility problem, e.g., crack in the floor, etc. As such, a geo-feature can be set up to ignore reports of impacts at the specific location of the known facility problem until the problem is corrected. Here, it may be desirable to require that a manager manually create the geo-feature, and then take the geo-feature down once the facility problem is remedied. In certain implementations, the system can be intelligent, so as to expunge previously reported and recorded impacts where it is judged that the impact was a facility issue at the designated location of the geo-feature, and not a true impact. As such, an operator is not improperly penalized for improper vehicle operation.

At 704, the industrial vehicle monitors (e.g., continuously) location information identifying a current location of the industrial vehicle. Here, the term "continuously" means repeatedly, such as in a continuous or recurring cycle, and thus includes periodic discrete measurements, accounting for practical delays in processing circuitry. For instance, vehicle position may be updated electronically several times a second. On the other hand, slower moving industrial vehicles may update every second or longer, depending upon the desired resolution to adequately track the vehicle position.

As noted in greater detail herein, the industrial vehicle may include a system that tracks its location based on landmarks within the facility, e.g., using the environmental based location tracking 220 of FIG. 2. As another example, the industrial vehicle may include a global positioning system (GPS), triangulation system or other system that allows location to be determined. As a further example, the industrial vehicle may include a transponder, and the position of the industrial vehicle may be triangulated within the facility. Other methods may be used to determine the industrial vehicle's location.

Regardless of the method used to determine the industrial vehicle's location, the industrial vehicle collects the location information. For example, if the location information is determined on the industrial vehicle itself, then the industrial vehicle already has access to the location information. However, if the location information is determined off of the industrial vehicle, then the location information is transmitted to the industrial vehicle (e.g., via the wireless transceiver). Here, the location information reflects the current location of the industrial vehicle as the industrial vehicle is operated At 706, the industrial vehicle collects operation information about a current operating state of the industrial vehicle. For example, the operation information may be collected from subsystems of the industrial vehicle (e.g., traction system, hydraulic system, accelerometers, controller states, switch states, etc.) and stored in memory on the industrial vehicle, e.g., by collecting information from controllers/modules 216 across a industrial vehicle network system 214 for storage and processing by the control module 204 of FIG. 2.

Upon detecting that the industrial vehicle encounters the geo-feature, the process further comprises generating at 708, an output message based on the based on the geo-feature information, the location information, and the operating information. In an example implementation, the output message is generated by determining an expected operating state of the industrial vehicle from the geo-feature information, where the expected operating state includes an acceptable range, and comparing the current operating state of the industrial vehicle to the expected operating state. For instance, the process may identify an acceptable range for the expected operating state selected from the group consisting of speed of the industrial vehicle, a height of forks of the industrial vehicle, a time that the industrial vehicle may remain in the predefined geo-feature, and an orientation of the industrial vehicle. The process then generates at least one of a first message as the output message where the comparison indicates that the current operating state is within the acceptable range of the expected operating state, and a second message as the output message, different than the first message, where the current operating state is outside the acceptable range of the expected operating state.

The process 700 can further comprise determining whether the predefined geo-feature is a message zone or an action zone, determining whether the industrial vehicle has encountered the predefined geo-feature, and storing, periodically, the operational information and the location information at least during the encounter with the geo-feature, as noted more fully herein. Here, conveying the output message further includes conveying the message on the industrial vehicle where the industrial vehicle is within the message zone. For example, if the industrial vehicle is traveling down an aisle and encounters a geo-feature (thus generating location information), where the geo-feature is implemented as a message zone (thus generating zone information) with forks of the industrial vehicle raised (thus generating operation information), then a certain message may be generated. However, if the operator enters the same zone with the forks lowered, a different message may be generated. An exemplary embodiment of 708 is described below in reference to 712-718 in regard to FIG. 7B, described below.

At 710, the output message is conveyed on the industrial vehicle. In an example configuration, the process 700 can further comprise selecting an output device for conveying the message based on at least one of: the operating information, a speed of the industrial vehicle, and an orientation of the industrial vehicle. Moreover, the process 700 can further comprise configuring at least two types of output messages including a first type of message as text on a screen of the industrial vehicle, and a second type of message on a screen of the industrial vehicle without using text. In this configuration, conveying the output message further comprises selecting whether to display the first type of message or the second type of message and displaying the selected type of message. Yet further, where the industrial vehicle comprises a first light visible to an interior of the industrial vehicle and a second light visible to an exterior of the industrial vehicle, the process 700 can comprise activating at least one of the first light and the second light of the industrial vehicle upon outputting the message.

For example, the output message may be displayed as text on a display screen attached to the industrial vehicle, as a symbol on the display screen, presented as an illuminated light mounted to the industrial vehicle that may be seen from an interior of the industrial vehicle, as a light mounted to the industrial vehicle that may be seen from an exterior of the industrial vehicle (e.g., by pedestrians), or combinations thereof.

Pedestrian communication is not limited to lights. Rather, lights, radio frequency, optical, RFID, ultrasonic communication (which is received and converted to a pedestrian feedback), and other technologies can be utilized to communicate intended information.

In yet another example implementation, the processor on the industrial vehicle identifies a current location of an industrial vehicle and collect operation information about a current operating state of the industrial vehicle by collecting the operational information. In response to detecting a geo-feature, the processor then causes the system to display a message on a display on the industrial vehicle.

Figure 7B:
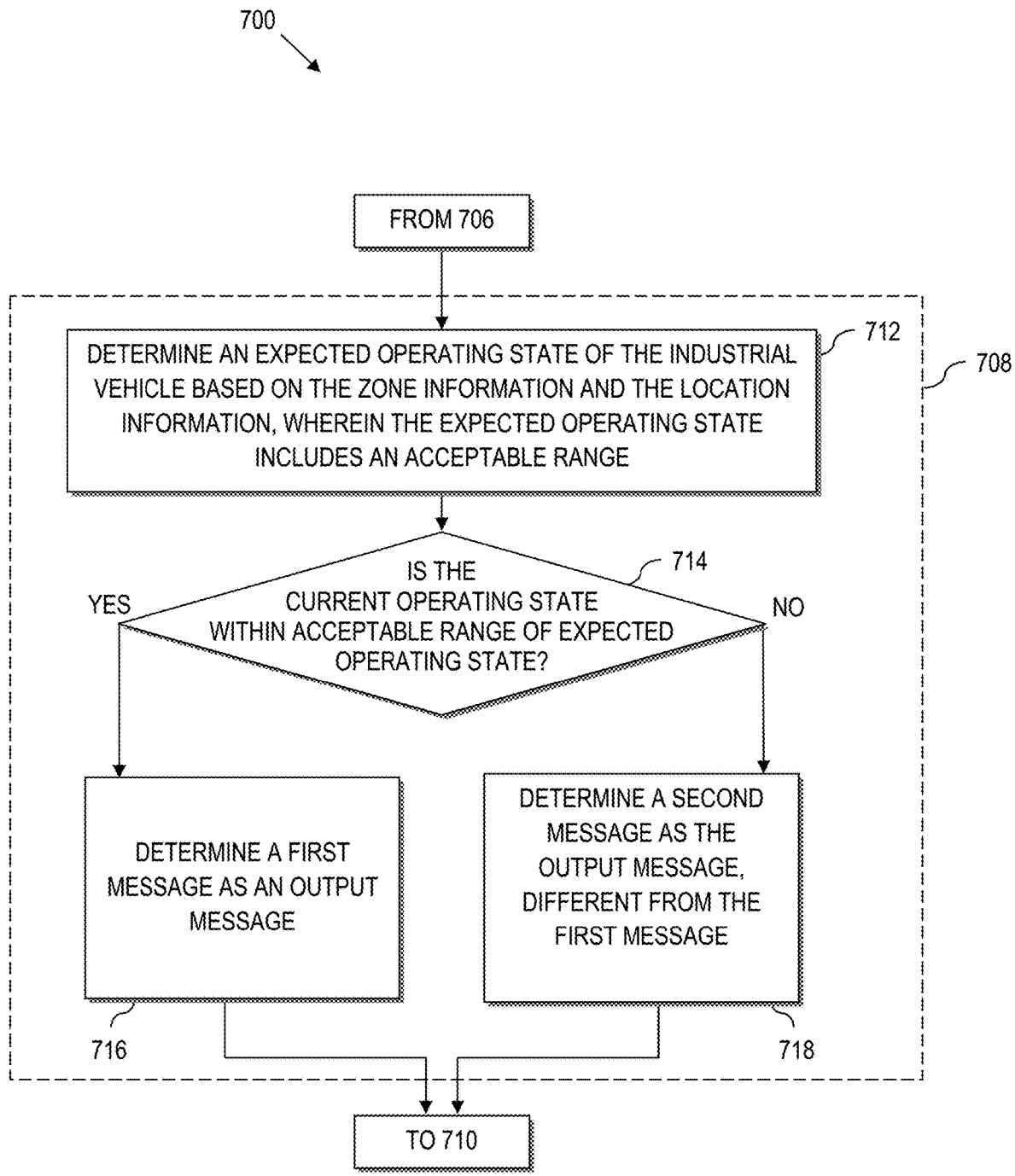
FIG. 7B illustrates a particular flow for carrying out the generation of output at 708 of FIG. 7A.

Referring now to FIG. 7B, an optional process is disclosed for carrying out the generation of the output message at 708 of FIG. 7A.

At 712, an expected operating state of the industrial vehicle is determined based on a geo-feature (e.g., zone information) and operation information. For example, if the industrial vehicle enters a geo-feature such as a combined action/message zone that is a restricted-speed zone, then an expected operating state may be that the industrial vehicle is traveling between one and three miles-per-hour. As another example, if the industrial vehicle enters a restricted-height zone, then the expected operating state may be that the forks are below a maximum designated height. This may be required for example, to ensure that the industrial vehicle can pass under a lower ceiling, through a doorway, etc. As a further example, if the industrial vehicle enters a high-traffic zone, a speed zone may be generated such that the expected operating state (speed) of the industrial vehicle is between two and five miles-per-hour. As another example, an idle zone may include an expected operating state that the industrial vehicle may not remain in the idle zone for more than five minutes. As indicated in the examples above, the expected operating state may include a range of acceptable values.

At 714, the expected operating state is compared to the current operating state (i.e., the operation information) to determine whether the current operating state is within the acceptable range of the expected operating state. If the current operating state is within the acceptable range of the expected operating state, then at 716, a first message is determined as the output message. However, if the current operating state is outside the acceptable range of the expected operating state, then at 718, a second message (different from the first message) is determined as the output message.

For example, if the industrial vehicle enters a geo-feature such as a message zone adjacent to a geo-feature implemented as a stop zone, then an expected speed range is determined (e.g., less than two miles-per-hour). If the current speed of the industrial vehicle is four miles-per-hour, then message may be SLOW DOWN, STOP AHEAD. However, if the current speed of the industrial vehicle is one mile-per-hour, then message may be STOP AHEAD.

Conditions:

Moreover, the process in which the message is displayed may be dependent on the current operating state of the industrial vehicle. For example, if the message is STOP AHEAD and if the industrial vehicle is traveling below two miles-per-hour, then a display may read STOP AHEAD. However, if the industrial vehicle is traveling between two and three miles-per-hour, then the message may be converted to a flashing light, text free display on the display screen (e.g., a red octagon, etc). Alternatively, if the industrial vehicle is traveling over three miles-per-hour, then the message may be SLOW DOWN, STOP AHEAD, but that message may be converted to activate a red light on the interior of the industrial vehicle, so the operator does not need to look away from the aisle to determine the message. By changing the messages and the way those messages are displayed, the operator is less likely to suffer from "warning overload" where the operator sees so many warnings and alerts that most of them are ignored. Moreover, by avoiding detailed text based messages when the industrial vehicle operator is engaged in operating the industrial vehicle, distraction may be reduced.

Figure 8:
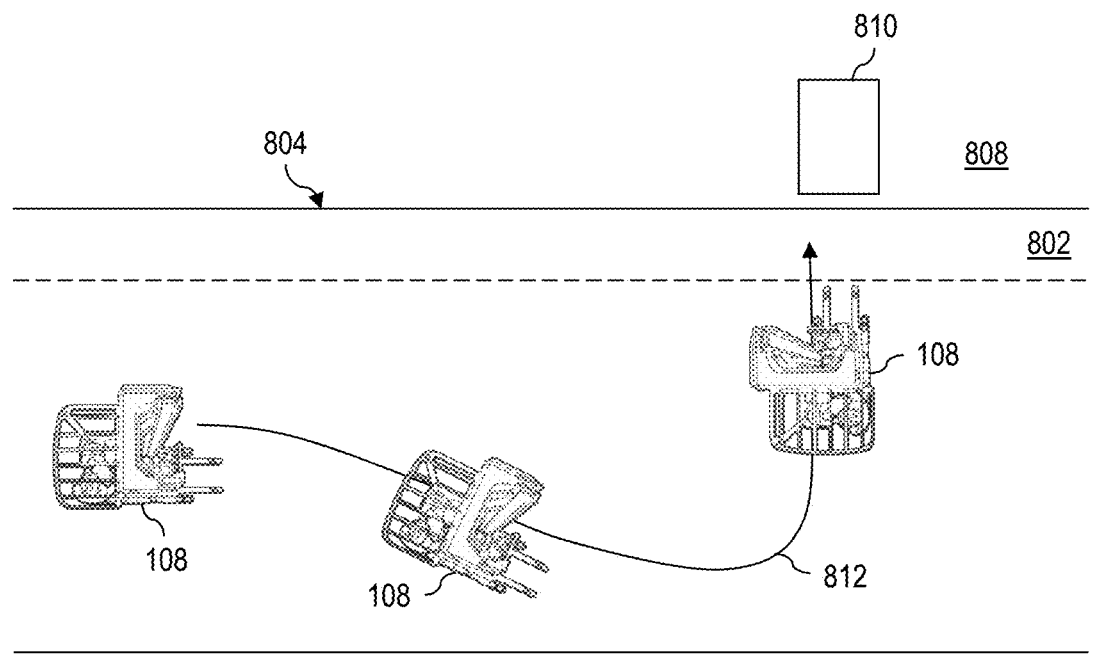
FIG. 8 is an illustration showing an example of the process for displaying a message on an industrial vehicle, according to various aspects of the present disclosure.

FIG. 8 illustrates an example of the use of conditions with the process 700 of FIG. 7A (and optionally 7B). A user sets up a fixed restricted zone 802 at an edge 804 of an aisle 806 of a facility, e.g., as described above, e.g., with regard to FIGS. 3-5. The restricted zone 802 acts as a buffer between the aisle 806 and a zone 808 where pedestrians may walk and where pallets 810 are kept. However, there may be situations where the industrial vehicle may have to breach the zone 808, such as to pick up an intended load. As such, properties can include "exclude" or "exception" conditions. For instance, an expected operating state of the industrial vehicle in the restricted zone 802 may be that the industrial vehicle is traveling below a predetermined speed, e.g., one mile-per-hour, and enters at an orientation angle suggestive of picking up a pallet, e.g., eighty-five to ninety-five degrees. As such, these parameters are encoded as exception properties. Then, zone information regarding the restricted zone 802 is wirelessly transmitted to an industrial vehicle 812. Thus, the industrial vehicle 108 collects zone information about the predefined zone (i.e., 802 of FIG. 8). As an operator of the industrial vehicle 108 performs tasks with the industrial vehicle 108 around the facility, location information and operation information is collected (i.e., 704 and 706 of FIG. 7).

In this example, the industrial vehicle 108 is assigned to move the pallet 810 to a different location. Therefore, the operator follows a path 812 that allows the industrial vehicle 108 to pick the pallet 810. When the industrial vehicle 108 encounters the geo-feature (e.g., enters the restricted zone 802), the expected operating state is determined (i.e., 710 in FIG. 7) and compared to the current operating state (i.e., 712 of FIG. 7). In this case, assume the industrial vehicle 108 has entered the restricted zone 802 at a ninety degree angle at a speed of one-half miles-per-hour. Recall that the expected operating state of the industrial vehicle in the restricted zone 802 is that the industrial vehicle is traveling below one mile-per-hour and enters at an orientation angle of eighty-five to ninety-five degrees. Therefore, the result of the comparison indicates that the current operating state is within the acceptable range of both conditions of the expected operating state. As such, a message (i.e., 714 of FIG. 7) indicating that there was an acceptable entry into the restricted zone is displayed (i.e., 718 of FIG. 7). Alternatively, no message may be conveyed at all when there is a successful entry (i.e., the message determined at 714 of FIG. 7 is "no message").

Figure 9:
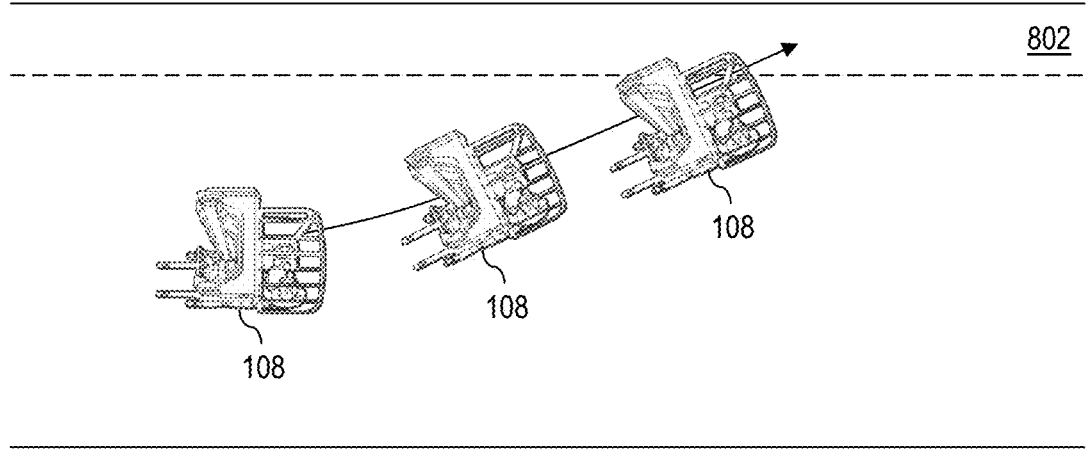
FIG. 9 is an illustration showing another example of the process for displaying a message on an industrial vehicle, according to various aspects of the present disclosure.

Turning now to FIG. 9, later in the day, the industrial vehicle 108 starts to drift into the restricted zone 802. When the industrial vehicle 108 enters the restricted zone 802, the expected operating state is determined (i.e., 710 in FIG. 7) and compared to the current operating state (i.e., 712 of FIG. 7). In this case, the industrial vehicle 108 has entered the restricted zone 802 at a thirty degree angle at a speed of one-half miles-per-hour. Therefore, the result of the comparison indicates that the current operating state is outside the acceptable range of the expected operating state. As such, a message (i.e., 714 of FIG. 7) indicating that there was an unacceptable entry into the restricted zone is conveyed (i.e., 718 of FIG. 7), e.g., via a textual message on the display of the industrial vehicle, a light, a sound, an audible voice command/message, a haptic response, etc.

Assume the industrial vehicle 108 enters a geo-feature 802 at a thirty degree angle at a speed of five miles-per-hour, then the message indicating an unacceptable entry may be converted to a flashing red light in the interior of the industrial vehicle 108. Moreover, a light on the exterior of the industrial vehicle 108 may illuminate, e.g., flash to warn pedestrians of the breach, an alarm sound may be sounded, etc.

Regardless, the industrial vehicle logs the location information and operation information a preset duration before the geo-feature, while the industrial vehicle 108 remains in the geo-feature, and for a preset duration after the industrial vehicle exits the geo-feature.

Figure 10:
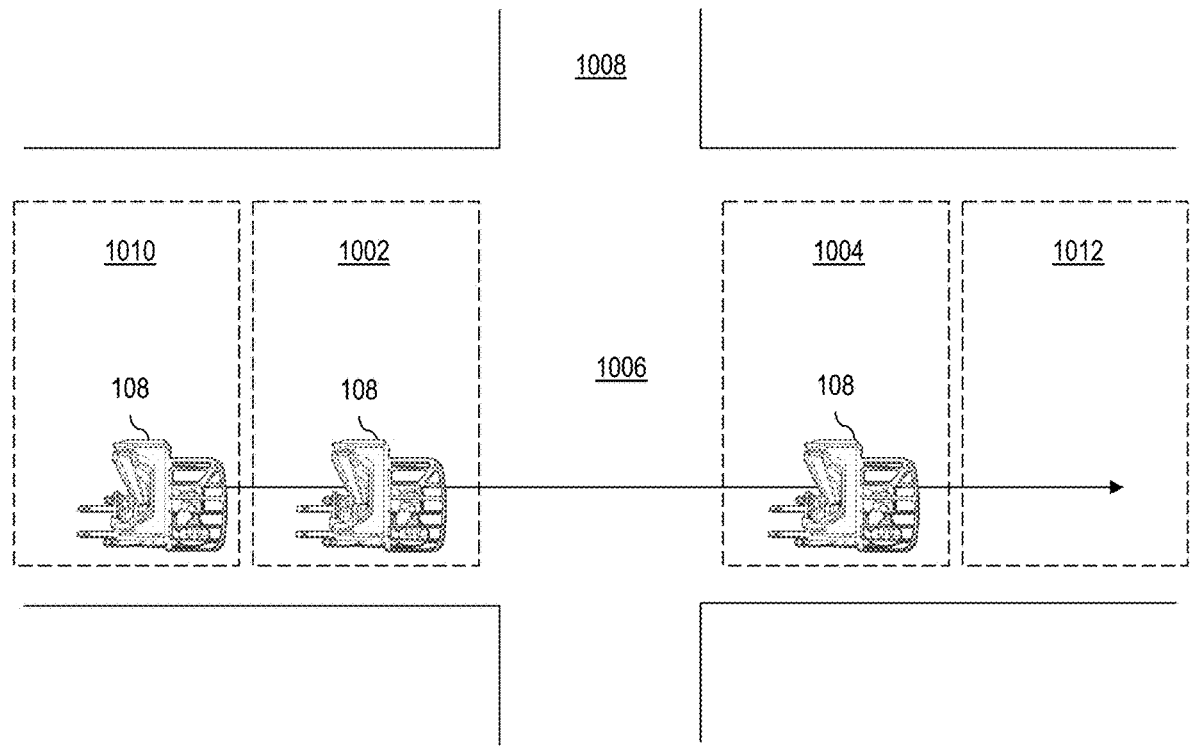
FIG. 10 is an illustration showing yet another example of the process for displaying a message on an industrial vehicle, according to various aspects of the present disclosure.

FIG. 10 shows another example of the process 700 of FIG. 7A. In this example, a user sets up a first stop zone 1002 and a second stop zone 1004 in an aisle 1006 on opposite sides of a pedestrian walkway 1008. A third zone 1010 is placed before the first stop zone 1002 and is a message zone that warns the operator that a stop zone 1002 is ahead. A fourth zone 1012 is placed before the second stop zone 1004 and is a message zone analogous to the third zone 1010, but the message warns the operator of stop zone 1004 ahead. The above is set up, such as described more fully herein with regard to FIGS. 3-5. The zone information, location information, and operation information are collected (702, 704, and 706 in FIG. 7) as above. When an industrial vehicle 108 enters left to right in the FIGURE, the industrial vehicle encounters the first geo-feature (i.e., the message zone 1010) that informs the operator of the industrial vehicle of the stop zone 1002 ahead. The industrial vehicle enters the stop zone 1002 and is expected to stop at the end of the aisle adjacent to zone 1002. When the industrial vehicle 108 drives through the walkway 1008, it encounters another geo-feature (the stop zone 1004). However, this time, the geo-feature 1004 detects that the industrial vehicle is traveling left to right in this example, and as such, this geo-feature does not apply to the industrial vehicle 108. As such, the geo-feature 1004 does not provide a message to the vehicle operator to stop. Moreover, the geo-feature 1012 does not provide a message to the vehicle operator informing of the impending stop because the industrial vehicle is traveling in the wrong direction for the message of prompt zone 1012 to be applicable.

On the other hand, were the industrial vehicle to be traveling right to left in this example, the geo-features 1012 and 1004 would be applicable to the industrial vehicle, whereas the geo-features 1002 and 1010 would not be relevant to the industrial vehicle. As such, any messaging, prompting, warning, scoring or other features of geo-features 1002 and 1010 would not be performed in this example. Since the geo-features 1002 and 1010 are judged to be not relevant to the industrial vehicle 108 in this example, then no infraction of the geo-feature is recorded.

Figure 11:
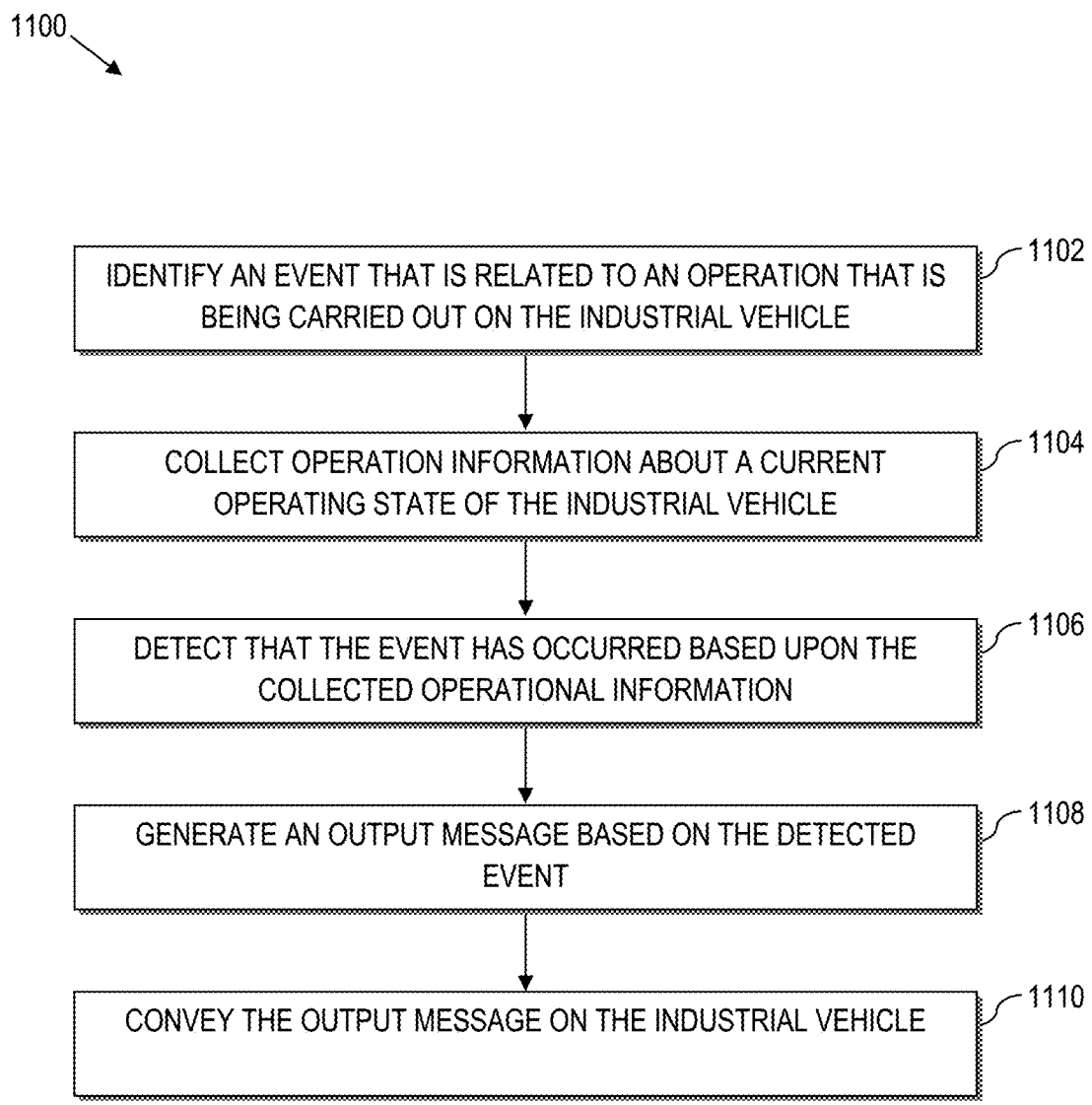
FIG. 11 is a flow chart illustrating a vehicle based event generation approach, according to aspects of the present disclosure.

Vehicle Based Event Detection:

Referring to FIG. 11, in an industrial vehicle, a machine-executable process 1100 is illustrated. The process 1100 can be implemented on any of the processing device 102 of FIG. 1. Moreover, the process 1100 may be implemented by the purpose built computer illustrated in FIG. 2, e.g., a processor on an industrial vehicle 108.

The process 1100 comprises identifying at 1102 (e.g., by a processor on the industrial vehicle) an event that is related to an operation that is being carried out on the industrial vehicle, and collecting at 1104 operation information about a current operating state of the industrial vehicle. The process 1100 also comprises performing at 1106 upon detecting that the event has occurred based upon the collected operational information, one or more actions. In an example configuration the actions comprise detecting the location of the industrial vehicle at the time of the occurrence of the event, generating an event record encapsulating the collected operational information from a time before the detected event until a time after the detected event, the event record including at least one of captured information indicative of direction, heading, and speed of travel of the industrial vehicle, integrating information indicating the detected location of the industrial vehicle into the event record, and wirelessly transmitting the event record to a server computer.

Still further, the process 1100 comprises generating at 1108 an output message based on the detected event, and conveying at 1110 the output message on the industrial vehicle.

The process may also comprise detecting the location of the industrial vehicle at the time of the occurrence of the event, such as by continuously monitoring location information identifying a current location of an industrial vehicle (e.g., using the environmental based location tracking 220 of FIG. 2 and/or other techniques as described more fully herein). Here, the process can integrate the detected location information into the event record by integrating location information into the event record so as to capture the location of the industrial vehicle before the detected event, during the detected event, and after the detected event.

By way of example, the process may generate an event record encapsulating the collected operational information from a time before the detected event until a time after the detected event, integrating the detected location information into the event record in a manner analogous to that set out in greater detail herein. Also the process can include wirelessly transmitting the event record to a server computer. For instance, detecting the location of the industrial vehicle at the time of the occurrence of the event can be carried out by continuously monitoring location information identifying a current location of an industrial vehicle. Also, integrating the detected location information into the event record can include integrating location information into the event record so as to capture the location of the industrial vehicle before the detected event, during the detected event, and after the detected event. In addition to location information, the event record can also capture the direction, heading, speed of travel, etc., of the industrial vehicle. Also, as noted more fully herein, vehicle state, operator data, timestamps, etc., can also be accumulated into the event record.

As an example, if an aggressive steer is detected regardless of location, the system generates an event record that includes data from a time before the aggressive steer event, during the aggressive steer event, and a time after the aggressive steer event, (along with location, direction, speed, and other data as described more fully herein) and uploads this event record to the server 112. The system also generates a message, e.g., "WATCH STEERING", sounds an audible tone, provides a voice response, illuminates a light, or provides other feedback as noted more fully herein.

This simplified example is presented by way of illustration. Further examples of identifying an event comprises identifying at least one of: detecting an impact associated with the industrial vehicle, detecting erratic steering with raised forks, detecting fast steering with raised forks, detecting cornering high speed with raised forks, detecting braking suddenly with an elevated load, detecting that a load capacity is over a predetermined capacity load limit, detecting exceeding a predetermined height extended travel while in free lift, detecting that the forks are extended and that the industrial vehicle is traveling with the forks elevated, and detecting that a reach is extended and that the industrial vehicle is traveling with the reach extended.

Further examples include identifying an event by identifying at least one of: detecting that the industrial vehicle is operating with an undersized battery, detecting that the industrial vehicle is operating with an underweight battery, detecting early or late battery charges, detecting improper battery care, including water schedule and proper cycling, detecting a battery equalization schedule, detecting an efficiency driving style profile, detecting an excess of energy usage based upon a detected driving profile, detecting the usage of a specific type of fuel usage, and detecting fuel/battery run-out events.

Yet further examples of identifying an event comprise identifying at least one of: detecting excessive travel of the industrial vehicle outside typical distance, detecting that lift usage cycles of the industrial vehicle are outside a range of typical cycles, detecting that the industrial vehicle is traveling on a ramp in an improper direction, detecting the presence of an idle operator on a stationary industrial vehicle where the operator is logged into the industrial vehicle, detecting that an operator exited the industrial vehicle while the industrial vehicle is still moving, and detecting an operator is logged into an industrial vehicle but is not present on the industrial vehicle.

Compliance Buffer:

In certain implementations, the thresholds can be "soft" or otherwise include a buffer before treating an event or geo-feature encounter in a negative manner. A buffer can be established as a property in the associated geo-feature or event.

For instance, if a geo-feature is a speed zone with a maximum limit of 5 miles per hour, a programmed buffer may allow a variance of say ½ mile an hour to account for environment conditions. By way of example, the speed zone may be a long passageway, making it difficult to maintain precise speed control over the distance of the speed zone.

When the vehicle enters the buffer condition upon encountering a geo-feature or event, a warning can be triggered, e.g., via a message conveyed to the user in a manner as set out in greater detail herein. However, if the vehicle remains in the buffer region, or returns to a normal, expected condition for the speed zone, an event record need not be generated. The concept of a buffer can be applied to numerous other geo-features and events including those described more fully herein, thus the discussion above is not intended to be limiting.

Miscellaneous:

Aspects of the present disclosure request specific and timely vehicle behavior e.g., in response to geo-features, events, etc. This requested behavior is often directly attributable to vehicle operator behavior. Regardless, the system monitors and documents compliance with the programmed and requested vehicle action. Again, this can also be attributed to operator action. The system also provides real-time feedback to the vehicle whether compliance was attained or not.

In some implementations, some communication may occur during an incorrect behavior (e.g. speed zones, restricted areas, impacts, idle time, and height restrictions), when the operator can still correct the behavior. On the other hand, some communication occurs after an incorrect behavior (e.g. stops and horn usage zones), letting the operator know an incorrect behavior was performed.

The system may further provide the ability to enable a user to turn on and off certain properties of geo-features, e.g., to customize the geo-feature experience.

Location Based vs. Operation Based Variables:

As described more fully herein, the geo-feature properties include processing capability to modify location based responses, e.g., entering a prompt zone, and augmenting or altering a primary control (e.g., present a text message on a display screen) with other control features based upon operation based variables (e.g., vehicle speed, aggressive steering, racing, etc.). For instance, the text message can be replaced, augmented, modified, etc., based upon detecting abnormal vehicle operating characteristics.

Geo-Feature Visualization:

In some instances, it may be desirable to make the location of geo-features known to the vehicle operator. Geo-feature identification can be carried out through the use of lasers in the warehouse that map out the boundary of geo-features. This use of lasers can be temporary or displayed for extended durations. Moreover, the display on the industrial vehicle may be used to see the model of the warehouse with geo-features identified thereon.

Computer System Overview

Figure 12:
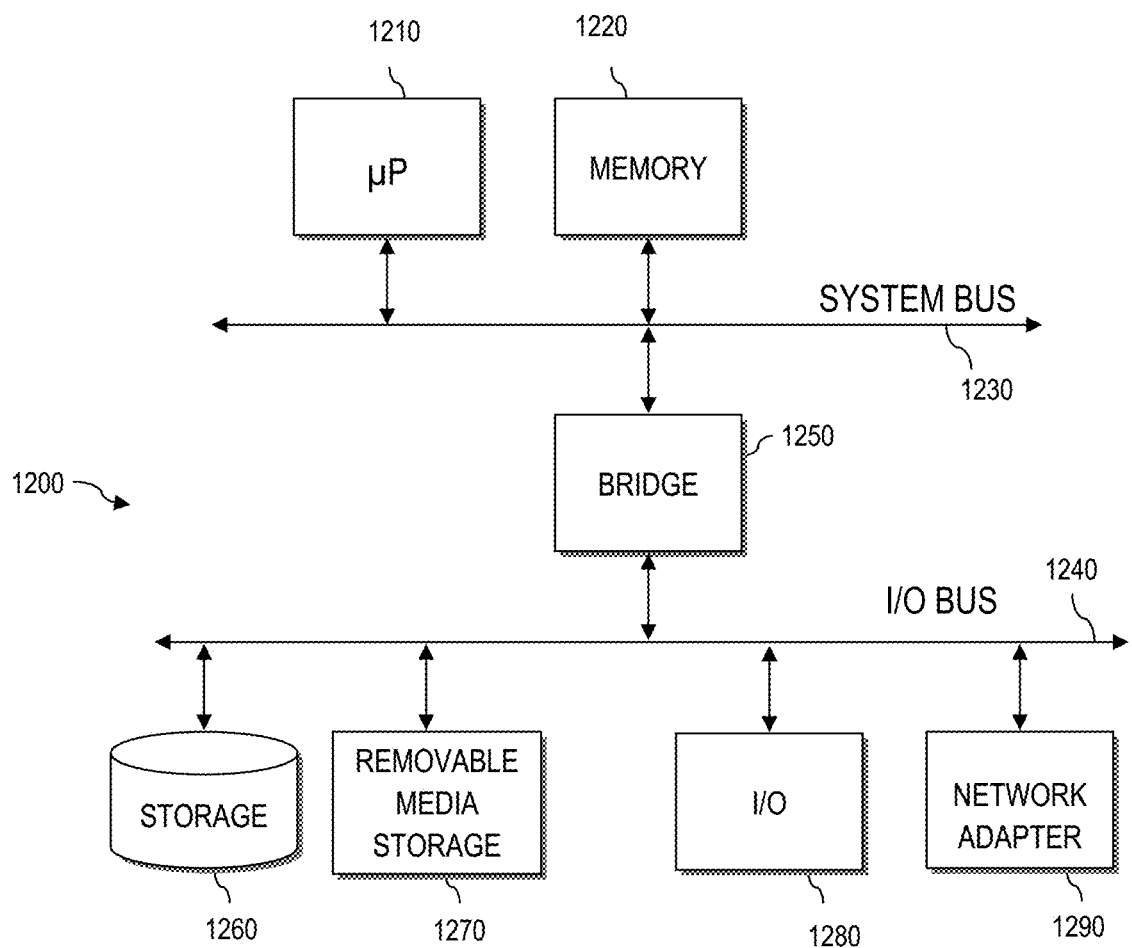
FIG. 12 is a block diagram of a computer processing system capable of implementing any of the systems, processes (or subsets thereof) described more fully herein.

Referring to FIG. 12, a schematic block diagram illustrates an exemplary computer system 1200 for implementing the various process described herein. The exemplary computer system 1200 includes one or more (hardware) microprocessors (μP) 1210 and corresponding (hardware) memory 1220 (e.g., random access memory and/or read only memory) that are connected to a system bus 1230. Information can be passed between the system bus 1230 and bus 1240 by a suitable bridge 1250. The bus 1240 is used to interface peripherals with the one or more microprocessors (μP) 1210, such as storage 1260 (e.g., hard disk drives); removable media storage devices 1270 (e.g., flash drives, DVD-ROM drives, CD-ROM drives, floppy drives, etc.); I/O devices 1280 (e.g., mouse, keyboard, monitor, printer, scanner, etc.); and a network adapter 1290. The above list of peripherals is presented by way of illustration, and is not intended to be limiting. Other peripheral devices may be suitably integrated into the computer system 1200. The memory 1220, storage 1260, removable media insertable into the removable media storage 1270 or combinations thereof, can be used to implement the processes, configurations, interfaces and other aspects set out and described herein.

The microprocessor(s) 1210 control operation of the exemplary computer system 1200. Moreover, one or more of the microprocessor(s) 1210 execute computer readable code that instructs the microprocessor(s) 1210 to implement the processes herein. The computer readable code may be stored for instance, in the memory 1220, storage 1260, removable media storage device 1270 or other suitable tangible storage medium accessible by the microprocessor(s) 1210. The memory 1220 can also function as a working memory, e.g., to store data, an operating system, etc.

The processes herein may be implemented as a machine-executable process executed on a computer system, e.g., one or more of the processing devices 102 of FIG. 1, on a particular computing device such as the vehicle computer described with reference to FIG. 2, on a system 1200 of FIG. 12, or combination thereof. In this regard, the processes herein may be implemented on a computer-readable storage device (e.g., computer-readable storage hardware) that stores machine-executable program code, where the program code instructs a processor to implement the described process. The processes herein may also be executed by a processor coupled to memory, where the processor is programmed by program code stored in the memory, to perform the described process.

Thus, the exemplary computer system 1200 or components thereof can implement processes and computer-readable storage devices as set out in greater detail herein. Other computer configurations may also implement the processes and computer-readable storage devices as set out in greater detail herein. Computer program code for carrying out operations for aspects of the present invention may be written in any combination of one or more programming languages. The program code may execute entirely on the computer system 1200 or partly on the computer system 1200. In the latter scenario, the remote computer may be connected to the computer system 600 through any type of network connection, e.g., using the network adapter 690 of the computer system 600.

In implementing computer aspects of the present disclosure, any combination of computer-readable medium may be utilized. The computer-readable medium may be a computer readable signal medium, a computer-readable storage medium, or a combination thereof. Moreover, a computer-readable storage medium may be implemented in practice as one or more distinct mediums.

A computer-readable signal medium is a transitory propagating signal per se. A computer-readable signal medium may include computer readable program code embodied therein, for example, as a propagated data signal in baseband or as part of a carrier wave. More specifically, a computer-readable signal medium does not encompass a computer-readable storage medium.

A computer-readable storage medium is a tangible device/hardware that can retain and store a program (instructions) for use by or in connection with an instruction execution system, apparatus, or device, e.g., a computer or other processing device set out more fully herein. Notably, a computer-readable storage medium does not encompass a computer-readable signal medium. Thus, a computer readable storage medium, as used herein, is not to be construed as being transitory signals per se, such as radio waves or other freely propagating electromagnetic waves through a transmission media.

Specific examples (a non-exhaustive list) of the computer-readable storage medium include the following: a hard disk, a random access memory (RAM), a read-only memory (ROM), an erasable programmable read-only memory (EPROM), Flash memory, a portable computer storage device, an optical storage device such as a compact disc read-only memory (CD-ROM) or digital video disk (DVD), or any suitable combination of the foregoing. In particular, a computer-readable storage medium includes computer-readable hardware such as a computer-readable storage device, e.g., memory. Here, a computer-readable storage device and computer-readable hardware are physical, tangible implementations that are non-transitory.

By non-transitory, it is meant that, unlike a transitory propagating signal per se, which will naturally cease to exist, the contents of the computer-readable storage device or computer-readable hardware that define the claimed subject matter persists until acted upon by an external action. For instance, program code loaded into random access memory (RAM) is deemed non-transitory in that the content will persist until acted upon, e.g., by removing power, by overwriting, deleting, modifying, etc.

Moreover, since hardware comprises physical element(s) or component(s) of a corresponding computer system, hardware does not encompass software, per se.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A machine-executable process in an industrial vehicle environment, comprising:
   obtaining geo-feature information about a geo-feature that is located in an area upon which an industrial vehicle travels;
   detecting that the industrial vehicle has encountered the geo-feature; and
   performing, upon detecting that the industrial vehicle has encountered the geo-feature:
      identifying a current operating state of the industrial vehicle by collecting operational information from the industrial vehicle;
      determining an expected operating state of the industrial vehicle from the obtained geo-feature information;
      comparing the current operating state of the industrial vehicle to the expected operating state of the industrial vehicle;
      determining whether the geo-feature is a message zone or an action zone;
      monitoring location information identifying a current location of the industrial vehicle;

storing, periodically, the operational information and the location information at least during the encounter with the geo-feature; and generating an output message comprising a select one of:
- a first message where the comparison indicates that the current operating state is within an acceptable range of the expected operating state, and
- a second message different from the first message, where the current operating state is outside the acceptable range of the expected operating state; and conveying the output message on the industrial vehicle where the industrial vehicle is within the message zone;

wherein the machine-executable process is performed by a processor on the industrial vehicle.

2. The process of claim 1, wherein determining an expected operating state further comprises identifying an acceptable range for the expected operating state selected from the group consisting of speed of the industrial vehicle, a height of forks of the industrial vehicle, a time that the industrial vehicle remains in the predefined geo-feature, and an orientation of the industrial vehicle.

3. The process of claim 1 further comprising selecting an output device among a display, an audio device, and an illumination device for conveying the output message based on at least one of: the operational information, a speed of the industrial vehicle, and an orientation of the industrial vehicle.

4. The process of claim 1 further comprising:
configuring at least two types of output messages including a first type of message as text on a screen of the industrial vehicle, and a second type of message as at least one color on a screen of the industrial vehicle without using text;
wherein conveying the output message further comprises:
selecting whether to display the first type of message or the second type of message; and
displaying the selected type of message.

5. A machine-executable process in an industrial vehicle environment, comprising:
obtaining geo-feature information about a geo-feature that is located in an area upon which an industrial vehicle travels, wherein the industrial vehicle comprises a first light visible to an interior of the industrial vehicle and a second light visible to an exterior of the industrial vehicle;
detecting that the industrial vehicle has encountered the geo-feature; and
performing, upon detecting that the industrial vehicle has encountered the geo-feature:
identifying a current operating state of the industrial vehicle by collecting operational information from the industrial vehicle;
determining an expected operating state of the industrial vehicle from the obtained geo-feature information;
comparing the current operating state of the industrial vehicle to the expected operating state of the industrial vehicle; and
generating an output message comprising a select one of:
a first message where the comparison indicates that the current operating state is within an acceptable range of the expected operating state, and
a second message different from the first message, where the current operating state is outside the acceptable range of the expected operating state; and
conveying the output message on the industrial vehicle; and
activating at least one of the first light and the second light of the industrial vehicle upon outputting the message;
wherein the machine executable process is performed by a processor on the industrial vehicle.

6. The process of claim 1, wherein obtaining geo-feature information comprises dynamically generating the geo-feature in response to a detected impact involving the industrial vehicle.

7. A machine-executable process in an industrial vehicle environment, comprising:
obtaining geo-feature information about a geo-feature that is located in an area upon which an industrial vehicle travels, where obtaining geo-feature information comprises:
receiving by the processor of the industrial vehicle, via a wireless transceiver mounted on an industrial vehicle, the geo-feature information about the defined geo-feature;
detecting that the industrial vehicle has encountered the geo-feature, where detecting that the industrial vehicle has encountered the geo-feature comprises:
monitoring, by a processor on the industrial vehicle, location information identifying a current location of the industrial vehicle; and
comparing, by the processor, obtained geo-feature information identifying a location of the geo-feature to the identified current location of the industrial vehicle;
performing, upon detecting that the industrial vehicle has encountered the geo-feature:
identifying a current operating state of the industrial vehicle by collecting operational information from the industrial vehicle, by the processor on the industrial vehicle by communicating with at least one vehicle component across a vehicle network bus;
determining an expected operating state of the industrial vehicle from the obtained geo-feature information;
comparing the current operating state of the industrial vehicle to the expected operating state of the industrial vehicle; and
generating an output message comprising a select one of:
a first message where the comparison indicates that the current operating state is within an acceptable range of the expected operating state, and
a second message different from the first message, where the current operating state is outside the acceptable range of the expected operating state;
conveying the output message on the industrial vehicle; and
outputting the message further comprises displaying the message on a display on the industrial vehicle; and
wherein the machine executable process is performed by a processor on the industrial vehicle.

8. A graphical user interface for defining geo-features, comprising:
a hardware computing device configured to execute computer code to generate the graphical user interface, comprising a processor coupled to memory, where the processor executes program code stored in the memory to implement:
a display area that depicts a graphical representation of a virtual environment that models a physical environment where industrial vehicles operate;
a tool that enables a user to define a geo-feature and position the defined geo-feature within the virtual environment;
a data entry feature that enables the user to define properties that characterize the defined geo-feature;
an upload feature that uploads the defined geo-feature and associated properties to a wireless infrastructure that enables wireless communication across the physical environment modeled by the virtual environment such that:
a processor maps the virtually positioned geo-feature to a corresponding geo-feature positioned in the physical environment, and programs the functionality of the geo-feature in the physical environment according to the properties associated with the geo-feature in the virtual environment; and
upon an industrial vehicle encountering the defined geo-feature in the physical environment, a process triggers an action associated with the user-defined properties.

9. The graphical user interface of claim 8, wherein:
the display area depicts the graphical representation of the virtual environment as a two-dimensional map of the physical environment.

10. The graphical user interface of claim 8, wherein:
the display area depicts the graphical representation of the virtual environment as a three-dimensional map of the physical environment.

11. The graphical user interface of claim 8, wherein:
the data entry feature enables the user to define a select one of the properties that characterize the defined geo-feature, comprising at least one of:
a first type of the industrial vehicle that detects the geo-feature;
a second type of the industrial vehicle that does not detect the geo-feature;
an operator of the industrial vehicle;
a time of day;
an identification of an operating shift;
detected volume of congestion in the area of the geo-feature;
an operating condition of the industrial vehicle; and
a state of productivity; and
upon the industrial vehicle encountering the defined geo-feature in the physical environment, the process triggers the action associated if the select one of the properties is satisfied.

12. The graphical user interface of claim 8, wherein:
the tool enables the user to configure the geo-feature by defining at least one of:
data identifying the spatial location of the geo-feature;
a parameter that defines a type of geo-feature;
a rule that modifies the action; and
a first property that defines the action.

13. The graphical user interface of claim 8, wherein:
the tool further enables the user to define a second geo-feature that is associated with a movable physical object, such that the second geo-feature moves about the environment.

14. The graphical user interface of claim 8, wherein:
the tool further enables the user to draw a geo-zone on the graphical representation of the virtual environment, which corresponds to the geo-feature.

15. The graphical user interface of claim 8, wherein:
the tool further enables the user to define the action to be an alert to an operator of the industrial vehicle.

16. The graphical user interface of claim 8, wherein:
the tool further enables the user to define the action to be an alert to a pedestrian proximate to the industrial vehicle.

17. The graphical user interface of claim 8, wherein:
the tool further enables the user to define the action to be a set of messages comprising:
a critical message;
an alert;
a warning;
a pre-action instruction; and
a post action reinforcement; and
the process triggers the action, which selects at least one message in the set of messages, based upon detected industrial vehicle conditions.

18. The graphical user interface of claim 8, wherein:
the tool further enables the user to define geo-features in layers that are overlaid on the model based upon a predefined delineation so that the user can show or hide layers on the model in the display area.

19. The graphical user interface of claim 18 further comprising:
a report that enables the user to navigate the model and layers of geo-feature information overlaid on the model to navigate to those geo-features that triggered the associated action responsive to the industrial vehicle encountering the corresponding geo-feature.

20. The graphical user interface of claim 8 further comprising:
a menu option that enables the user to establish a hierarchy that defines a prioritization and conflict resolution where multiple geo-features overlap.

* * * * *